United States Patent

Ahmad et al.

Patent Number: 6,031,934
Date of Patent: Feb. 29, 2000

[54] COMPUTER VISION SYSTEM FOR SUBJECT CHARACTERIZATION

[75] Inventors: Subutai Ahmad, Palo Alto; Kevin L. Hunter, San Jose, both of Calif.

[73] Assignee: Electric Planet, Inc., Palo Alto, Calif.

[21] Appl. No.: 08/950,404

[22] Filed: Oct. 15, 1997

[51] Int. Cl.[7] .................................................. G06K 9/00
[52] U.S. Cl. ......................... 382/154; 382/284; 382/195
[58] Field of Search ..................................... 382/284, 294, 382/201, 203, 195, 282, 283, 154; 395/435, 116, 467; 348/584, 586, 489, 594, 595

[56] References Cited

U.S. PATENT DOCUMENTS

| | | | |
|---|---|---|---|
| 4,641,349 | 2/1987 | Flom et al. | 382/117 |
| 4,843,568 | 6/1989 | Krueger et al. | 364/518 |
| 5,148,477 | 9/1992 | Neely et al. . | |
| 5,454,043 | 9/1995 | Freeman . | |
| 5,548,659 | 8/1996 | Okamoto . | |
| 5,570,113 | 10/1996 | Zetts . | |
| 5,581,276 | 12/1996 | Cipolla et al. . | |
| 5,623,587 | 4/1997 | Bulman . | |
| 5,631,697 | 5/1997 | Nishimura et al. . | |
| 5,687,306 | 11/1997 | Blank | 395/135 |
| 5,767,867 | 6/1998 | Hu . | |
| 5,781,198 | 7/1998 | Korn . | |
| 5,790,124 | 8/1998 | Fischer et al. . | |

OTHER PUBLICATIONS

Chung–Lin Huang and Ming–Shan Wu, A Model–based Complex Background Gesture Recognition System, IEEE, 1996, vol. 1, pp. 93–98, abstract.

3DK: The Virtual Studio; Blending real and virtual spaces; Research area: Intelligent Multimedia Systems; GMD, Nov. 24, 1994.

*Primary Examiner*—Amelia Au
*Assistant Examiner*—Vikkram Bali
*Attorney, Agent, or Firm*—Hickman Stephens Coleman & Hughes, LLP

[57] ABSTRACT

Methods and apparatuses are disclosed for determining one or more characteristics of a sub-image within an electronic image.

In one embodiment, the present invention includes an alpha image generator and a characterizer. The alpha image generator provides an alpha image of the subject being characterized, separated from a background of the input image. In another embodiment, the alpha image generator also may provide a summed area table. The characterizer determines a characteristic of the subject from the alpha image.

In another embodiment, a first characteristic of the subject is derived from the alpha image. The characterizer determines a second characteristic based upon the first characteristic. In yet another embodiment, the determination of the second characteristic is simplified by eliminating all the unlikely estimates of the second characteristic in the overall potential estimates of the second characteristic. In one embodiment, simplification is accomplished by segmenting the alpha image and eliminating portions of the alpha image that do not correspond to the second characteristic. In a further embodiment, the remaining potential estimates are scored based upon the correlation of the alpha image with the estimate, the best estimate having the best score.

24 Claims, 17 Drawing Sheets

All measurements in inches

| Name | Shoulder W | Upper Body H | Head W | Head H | Arm Span | Upper Arm | Lower Arm |
|---|---|---|---|---|---|---|---|
| Average Male | 18.23 | 20.50 | 6.13 | 12.23 | 28.53 | 11.00 | 10.03 |
| Average Female | 15.87 | 19.10 | 5.73 | 11.67 | 26.17 | 10.20 | 9.07 |

Ratios

| Name | HW/SW | HH/SW | UBH/SW | AS/UA | SW/UA | HW/AS | HW/(AS+SW) | UBH/AS | HW/HH | LA/UA |
|---|---|---|---|---|---|---|---|---|---|---|
| Average Male | 0.34 | 0.68 | 1.13 | 2.60 | 1.66 | 0.22 | 0.13 | 0.72 | 0.50 | 0.91 |
| Average Female | 0.36 | 0.74 | 1.21 | 2.56 | 1.55 | 0.22 | 0.14 | 0.73 | 0.49 | 0.89 |

Figure 6

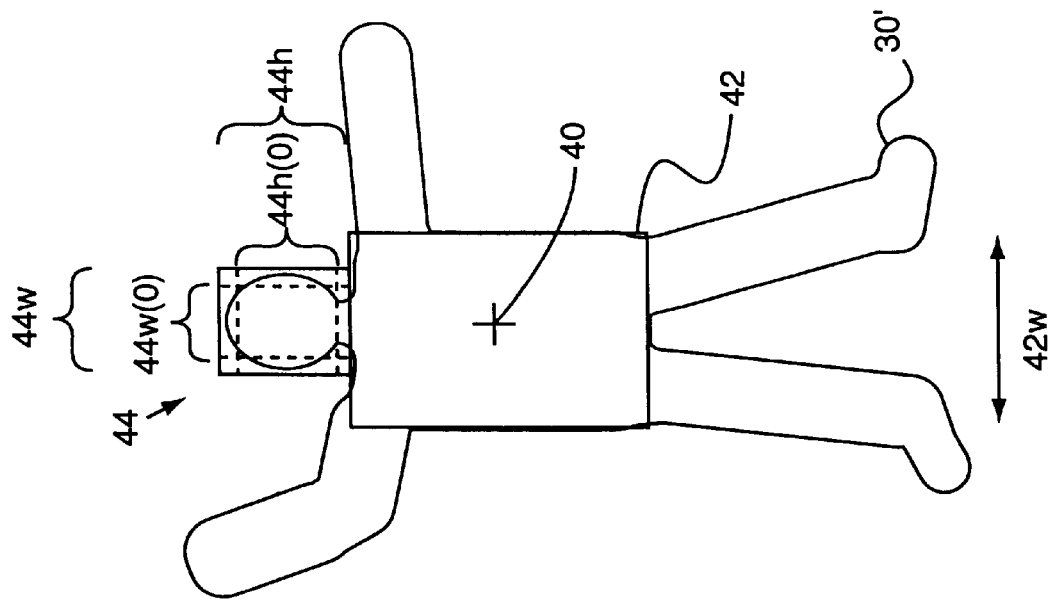
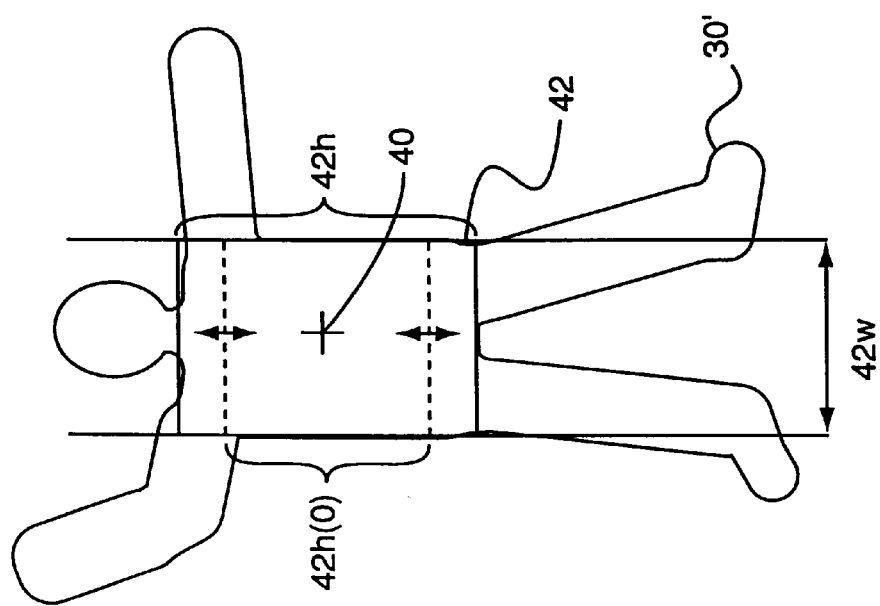

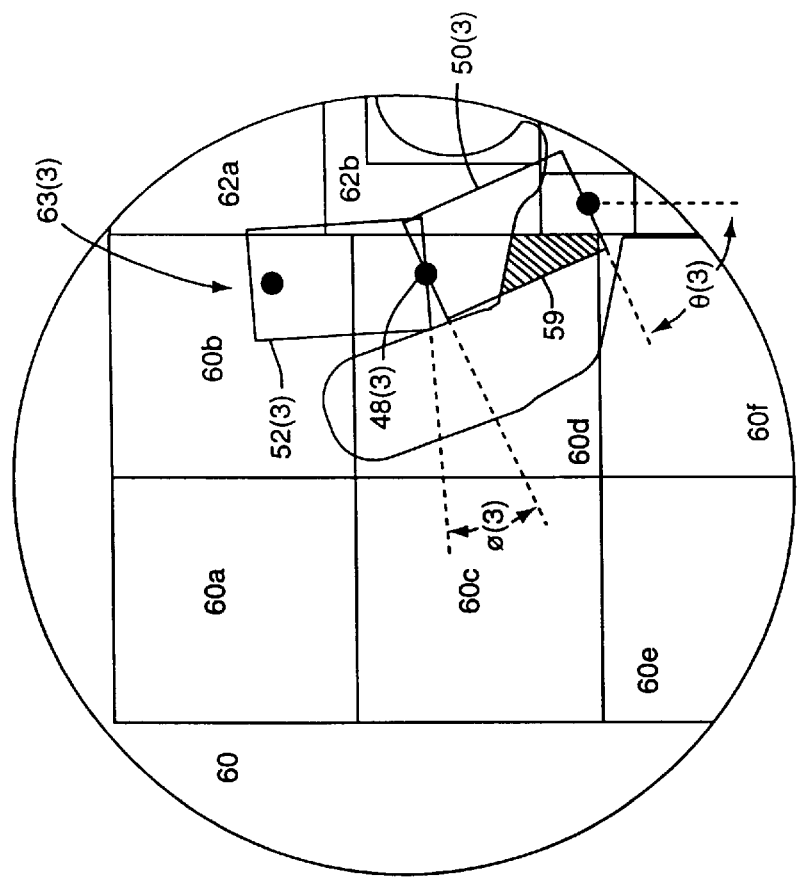
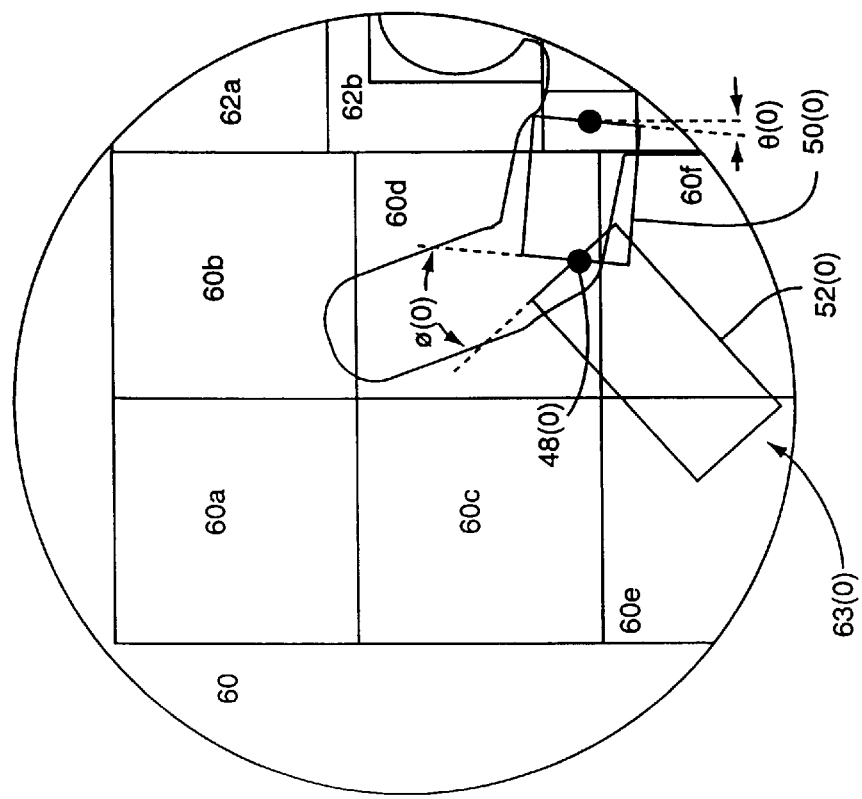

COMPUTER VISION SYSTEM FOR SUBJECT CHARACTERIZATION

CROSS REFERENCE TO RELATED APPLICATIONS

U.S. patent application Ser. No. 08/951,089, entitled "METHOD AND APPARATUS FOR MODEL-BASED COMPOSITING", by Subutai Ahmad, filed concurrently herewith; U.S. Provisional Patent Application Ser. No. 09/174,491, entitled "METHOD AND APPARATUS FOR PERFORMING A CLEAN BACKGROUND SUBTRACTION", by Jeffrey L. Edwards and Kevin L. Hunter, filed concurrently herewith; and U.S. patent application Ser. No. 08/951,083, entitled "A SYSTEM AND METHOD FOR PROVIDING A JOINT FOR AN ANIMATABLE CHARACTER FOR DISPLAY VIA A COMPUTER SYSTEM", by Kevin L. Hunter, filed concurrently herewith, all assigned to Electric Planet, Inc., are incorporated herein by reference in their entirety.

BACKGROUND OF THE INVENTION

The present invention relates to computer vision systems. More particularly, the present invention relates to an improved apparatus and method for determining the characteristics of an articulated member.

Computer vision is a development in the broader field of computer systems. One of the goals of computer vision systems is the ability to recognize objects contained in electronic images. For example, a video camera may record a single image or a series of images and relay the information to a computer system. The computer system may then be able to determine the relative position of objects, persons, animals or any other images within the computer image.

Several types of applications exist for computer vision systems. By way of example, in industrial applications, a computer vision system may be utilized to monitor and control a robotic arm used in a fabrication system. Computer vision systems may also be used for pattern recognition purposes, manufacturing quality control, motion analysis and security.

FIG. 1 illustrates a typical scene 2 that a computer vision system may be used to analyze. Scene 2 may include a subject 4 and a background 5. Subject 4 can be any object which the computer vision system may be used to analyze. By way of example, in the illustrated example, subject 4 is a person. Background 5 may include any part of scene 2 that is not part of subject 4. In the illustrated example, background 5 includes the sun, clouds, the sky and hills.

FIG. 2 illustrates an electronic image 10 derived from scene 2 of FIG. 1. Electronic image 10 may include an electronic representation of the background 25, and a subject image 20 of subject 4. Typically, computer vision systems are concerned with various aspects of subject image 20. In the illustrated example, several features of subject image 20 are enumerated 20a through 20h. By way of example, the enumerated features may include a center of mass point 20a, a body box 20b, a head box 20c, an arm box 20d, a forearm box 20e, a hand point 20f, an elbow point 20g, shoulder box 20h and a shoulder point 20i. However, in general, any type of suitable characteristic of subject image 20 may be obtained through the computer vision system.

As will be discussed in more detail below, the prior art methods of determining the characteristics of subject image 20, are often times complex and unable to be accomplished in real time. For example, one method of subject characterization is through the use of stereo vision. In stereo vision, two cameras are used to capture the electronic images of a subject, e.g., subject 4 of FIG. 1. One advantage of the stereo vision method is that a 2-D or a 3-D image may be generated.

However, problems exist with registration in a system which uses stereo vision. That is, it is often difficult to match the two images captured by the separate video cameras to create a coherent single image. The registration problem typically leads to faulty characterization of subject image 20. Additionally, the use of two cameras add to the expense and complexity of the computer vision system. Also, the stereo vision system is typically not capable of characterizing subject image 20 in real time.

Another method of subject characterization is through the use of markers. Typically, markers are placed at various points on a subject that the computer vision system would like to detect. In the illustrated example, markers may be placed on shoulder point 20i, elbow point 20g, hand point 20f, and center point 20a. The marker system may allow for real time characterization of subject image 20, however, there are several disadvantages.

The primary disadvantage associated with markers is that markers must be placed on subject 4 of FIG. 1 in order to obtain the various characteristics in subject image 20. The physical placement of markers is often not possible in situations where subject characterization is desired of objects not suitable for marking. For example, subject characterization may be desired of an animal in the wild. In such a case, markers cannot be placed on the wild animal.

Another disadvantage of using markers is that subject 4 of FIG. 1 must wear the markers. There may be a number of situations where the subject is not capable of or does not desire to wear markers, therefore, making subject characterization difficult. Additionally, the marker system may not be capable of obtaining all of the desired characteristics of subject 4. For example, body box 20b, head box 20a, arm box 20d, shoulder box 20h and forearm box 20e are two-dimensional shapes which may require a large number of markers in order to adequately characterize through computer vision. Once again, increasing the number of markers only adds to the difficulty and burden of using the marker system.

Another method of subject characterization using computer vision is to perform pretraining. A computer vision system may be used to preliminarily take and analyze electronic images of subject 4 before the actual subject characterization takes place in a real life situation. In this method, the computer vision system may be able to more accurately characterize subject 4 in a real life situation. However, this assumes that subject 4 is available for pretraining. If subject 4 is a wild animal or another subject that is not available for pretraining, this method of subject characterization may not be feasible. Further, the change in conditions between the training setting and the real life setting may diminish any benefit derived from pretraining.

As discussed, prior art systems, including the marker system and the pretraining system, may not be feasible in real life situations. However, other systems that do not utilize markers or pretraining may not be capable of real time operations because of the extensive amount of computations needed to accomplish subject characterization. Typically, prior art systems use exhaustive algorithms to determine the desired characteristics of subject image 20.

The use of such exhaustive algorithms assumes that the prior art systems are even capable of accurately capturing a subject image. To further distinguish the different points or parts of subject image 20, prior art systems may repetitively compare the current subject image 20 with all the possible sizes, shapes and positions subject 4 may be in. Typically, this exhaustive approach is incapable of producing real-time results.

Thus, what is desired is a more efficient computer vision system suitable for subject characterization. By eliminating the exhaustive nature of the characterization process of prior art systems, real time subject characterizations may be achieved. The increased efficiency should also remove the need for using markers and extensive pretraining of the computer vision system due to their inherent impractical nature.

SUMMARY OF THE INVENTION

To achieve the foregoing and other objects and in accordance with the purpose of the present invention, methods and apparatuses for determining one or more characteristics of a sub-image within an electronic image are disclosed. In one embodiment, a computer-implemented system for characterizing a subject is disclosed.

In one embodiment, the present invention includes an alpha image generator and a characterizer. The alpha image generator provides an alpha image of the subject being characterized, separated from a background of the input image. In another embodiment, the alpha image generator also may provide a summed area table. The characterizer determines a characteristic of the subject from the alpha image.

In another embodiment, a first characteristic of the subject is derived from the alpha image. The characterizer determines a second characteristic based upon the first characteristic. In yet another embodiment, the determination of the second characteristic is simplified by eliminating all the unlikely estimates of the second characteristic in the overall potential estimates of the second characteristic. In one embodiment, simplification is accomplished by segmenting the alpha image and eliminating portions of the alpha image that do not correspond to the second characteristic. In a further embodiment, the remaining potential estimates are scored based upon the correlation of the alpha image with the estimate, the best estimate having the best score.

In yet another embodiment, the second characteristic is determined based upon the relationship between the first and second characteristics. In a further embodiment, the relationship between the first and second characteristics is a ratio.

The present invention includes the elimination of extraneous points within an image in order to reduce the amount of processing necessary to obtain characteristics of an alpha image, indicative of the subject. A further advantage of the present invention is the use of predetermined ratios in order to provide estimations of the desired characteristic. By generating estimates, a number of improbable estimates may be discarded during the determination of the desired characteristic. Thus, real-time characterization of the subject is made possible, in one embodiment of the present invention.

In an other embodiment, a summed area table may be utilized to perform the task of determining which estimate is the best estimate. Further reductions in the amount of computations necessary to arrive at the best estimate are possible through the use of a summed area table. Thus, the present invention is thought to possess several advantages over the prior art. These and other features and advantages of the present invention will be presented in more detail in the following specification of the invention and the figures.

BRIEF DESCRIPTION OF THE DRAWINGS

The invention may best be understood by reference to the following description taken in conjunction with the accompanying drawings in which:

FIG. 6 is a table of body ratios associated with one embodiment of the present invention.

FIG. 7 illustrates the alpha image of FIG. 5 during a scanning procedure, in accordance with one embodiment of the present invention.

FIG. 8 illustrates the alpha image of FIG. 7 with a head box, in accordance with one embodiment of the present invention.

FIGS. 12a and 12b are enlarged views of the arm of the alpha image as shown in FIG. 11, in accordance with one embodiment of the present invention.

DETAILED DESCRIPTION OF THE INVENTION

An invention is described for improving subject characterization of a subject. The subject characterization process may be made more efficient by constraining the characterization process to the most relevant data points in an electronic image. In addition, improved methods of analyzing the electronic image to obtain the desired characteristics of the subject are further disclosed.

Another aspect of the present invention is the utilization of readily accessible information about the subject. By way of example, body ratios are discussed in relation to one embodiment of the present invention. Body ratios related to human beings are ratios of body parts relative to other body parts. Typically, the body ratios help to provide good estimations of the relative sizes and shapes of the different parts of the body once one part of the body is known. Analogously, animals, insects, and other living creatures also have standard body ratios that may be utilized in accordance with the present invention.

Information about a subject may be even more substantial. In the case of robotic limbs, the precise dimensions of the limbs may already be known. Thus, the number of iterative steps necessary to fully identify and characterize an image of the subject may be drastically reduced.

Numerous specific details are set forth in order to provide a thorough understanding of the present invention in the following description. It will be obvious, however, to one skilled in the art, that the present invention may be practiced without some or all of these specific details. In other instances, well known structures and process steps have not been described in detail in order not to unnecessarily obscure the present invention.

Figure 1:
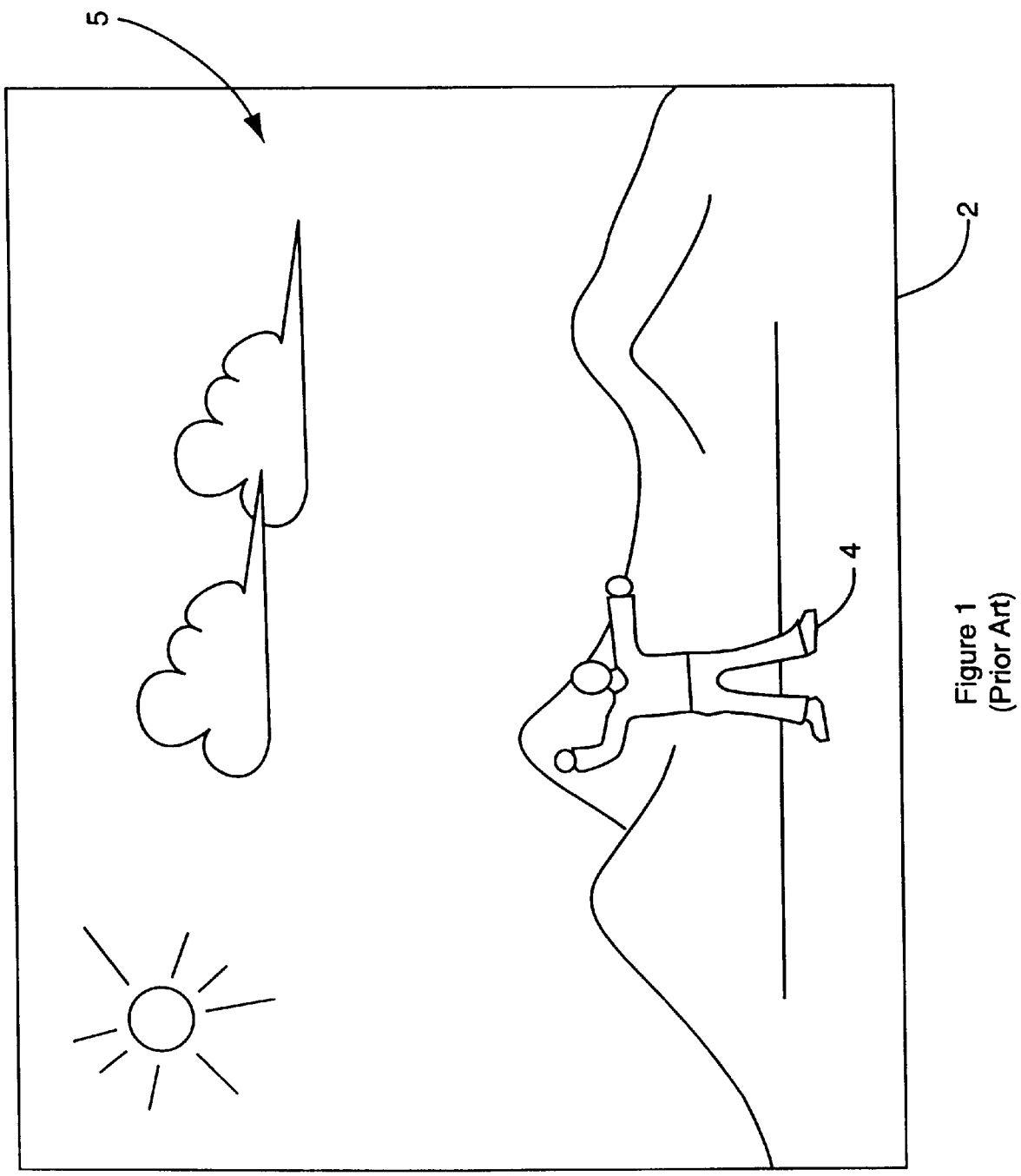
FIG. 1 illustrates a typical scene that a computer vision system may be used to analyze.
Figure 2:
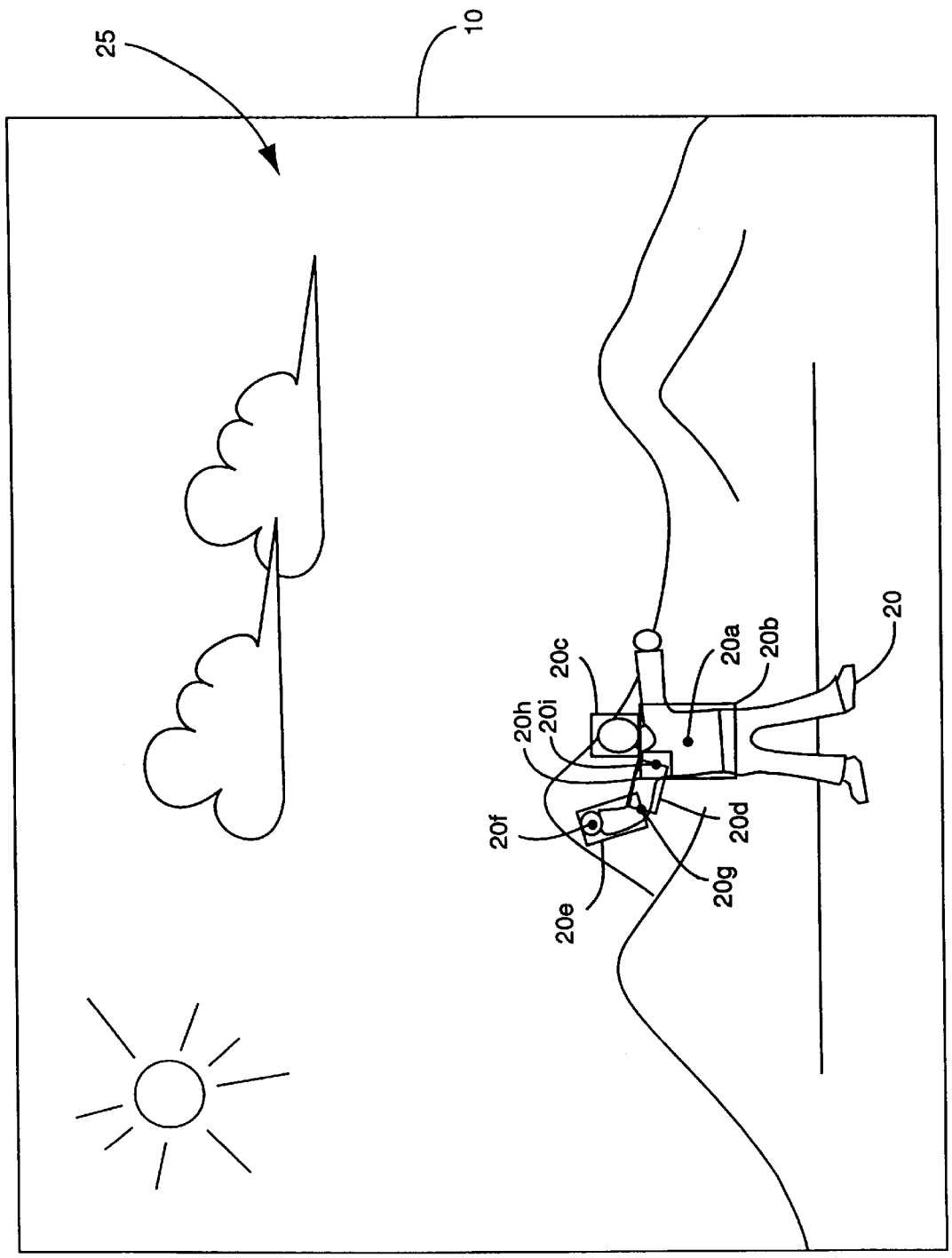
FIG. 2 illustrates an electronic image derived from the scene of FIG. 1.
Figure 3:
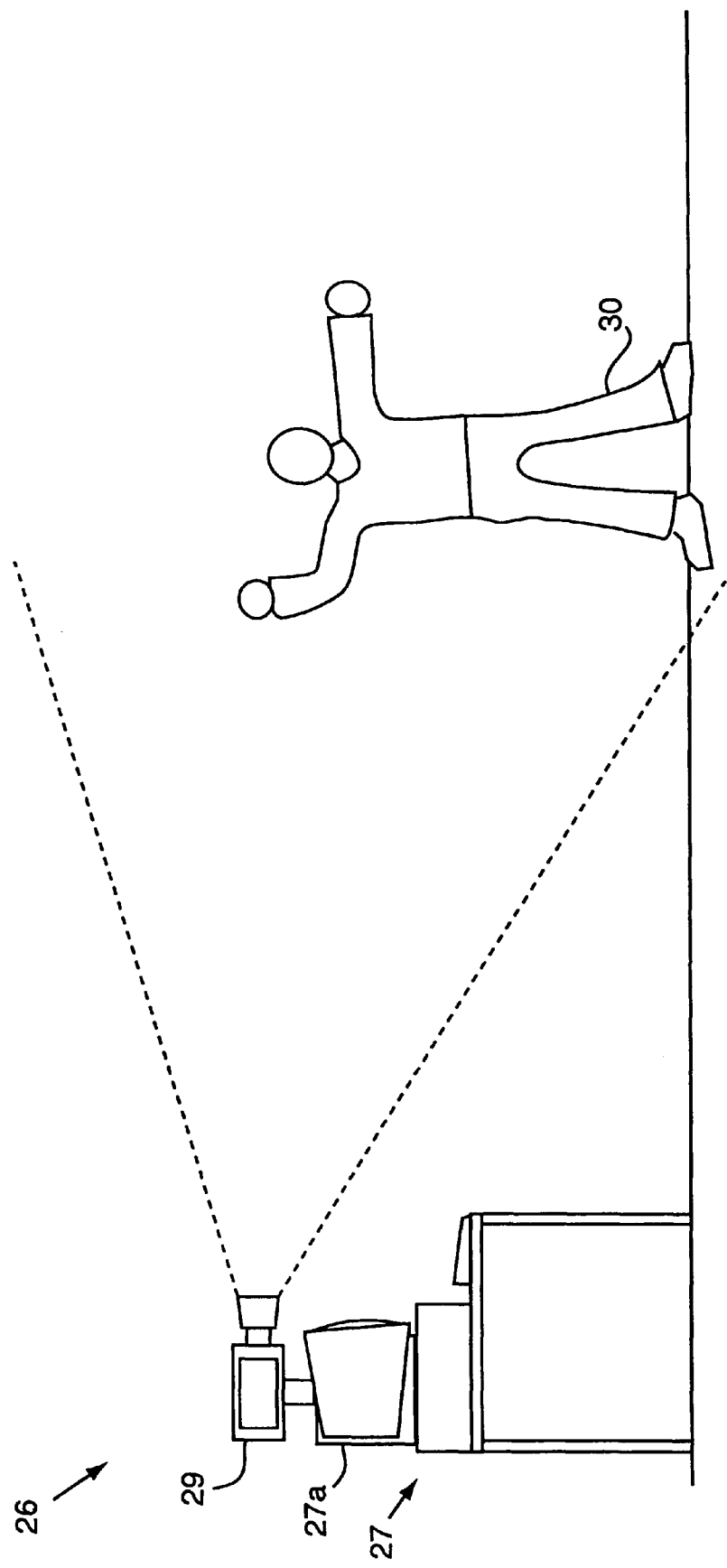
FIG. 3 illustrates a computer vision system in accordance with one embodiment of the present invention.

FIG. 3 illustrates a computer vision system in accordance with one embodiment of the present invention. Computer vision system 26 includes a computer system 27, including a monitor 27a, and a camera 29. Computer system 27 may be any suitable type of computing device. By way of example, computer system 27 may include a stand-alone personal computer, a computer connected to a network, or a terminal connected to a larger computing device or network. However, due to the advantages of the present invention, a typical desktop computer utilizing an Intel 133 MHz Pentium® based personal computer may be used in accordance with the present invention.

Camera 29 may be any type of device capable of generating a visual image. Camera 29 includes, but is not limited to, a device capable of capturing a real life image and converting it to an electronic image. In other words, Camera 29 may be a digital video camera. Any combination of devices may be utilized in accordance with the present invention, as long as a two-dimensional representation of a subject may be obtained. By way of example, an analog camera in combination with a D/A converter, a discrete digital camera, a scanner, an infra-red camera, radar or sonar may be utilized.

Camera 29 is typically directed at a subject 30 to capture an electronic image of subject 30. Subject 30 may be any suitable subject desired to be characterized. By way of example, subject 30 may be a person, an animal, a robotic arm, an insect, or substantially any other suitable type of multi-segmented living thing or animated object.

Figure 4:
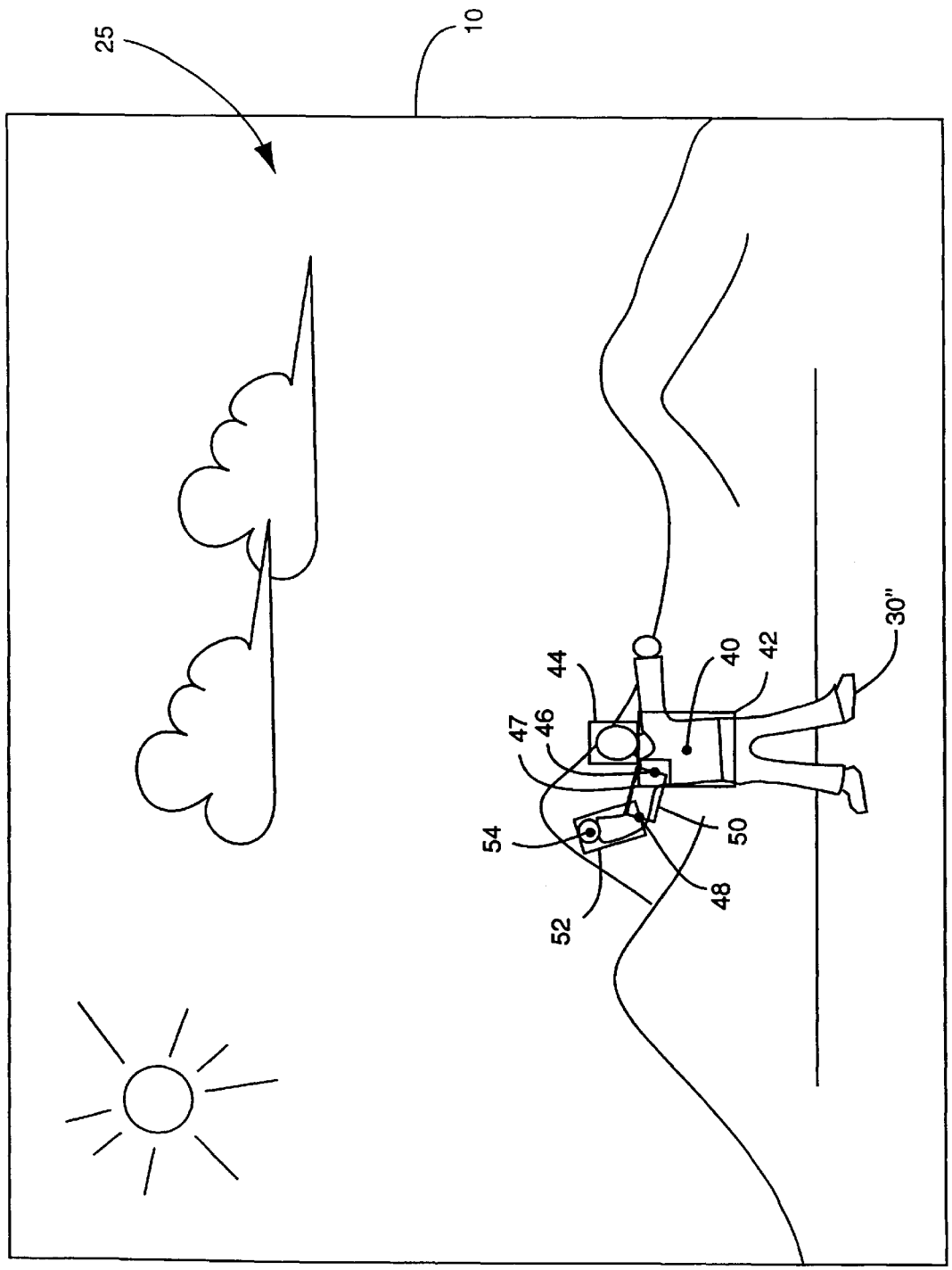
FIG. 4 illustrates an electronic image of the subject 30 of FIG. 3, in accordance with one embodiment of the present invention.

FIG. 4 illustrates an electronic image 10 of subject 30 in FIG. 3, in accordance with one embodiment of the present invention. Electronic image 10 is an electronic representation of a background 25 and subject 30. Electronic image 10 also includes a representation of subject 30 as subject image 30''. In one embodiment of the present invention, computer vision system 26 further provides characteristics of subject image 30'' along with electronic image 10. The characteristics include a center of body point 40, a body box 42, a head box 44, a shoulder point 46, a shoulder box 47, an arm box 50, an elbow point 48, a forearm box 52, and a hand point 54. The characteristics of subject image 30'' may include other characteristics of subject 30. By way of example, the characteristics may include knee points, foot points, hip points, leg and foreleg boxes, and any other suitable characteristics desired to be obtained regarding subject 30.

Furthermore, the characteristics may be specific to the type of subjects being captured by computer vision system 26. By way of example, different characteristic points and boxes may be desired for animals that may not be present in humans or non-living animate objects. It may also be appreciated that electronic image 10 may be any other suitable type of image generated by computer vision system 26. By way of example, image 10 may be a hard copy of the image, a film image, or any other type of suitable visual medium.

In order to properly characterize subject 30, the location and position of subject 30 must be extracted from the image. Subject image 30'' may be extracted from image 10 by subtracting out background 28. A method of subtracting out background 25 in order to provide subject image 30'' is disclosed in co-pending applications U.S. patent application Ser. No. 08/951,089, entitled "METHOD AND APPARATUS FOR MODEL-BASED COMPOSITING", and U.S. Provisional Patent Application Ser. No. 09/174,491, entitled "METHOD AND APPARATUS FOR PERFORMING A CLEAN BACKGROUND SUBTRACTION", which are incorporated herein by reference in their entirety.

Figure 5:
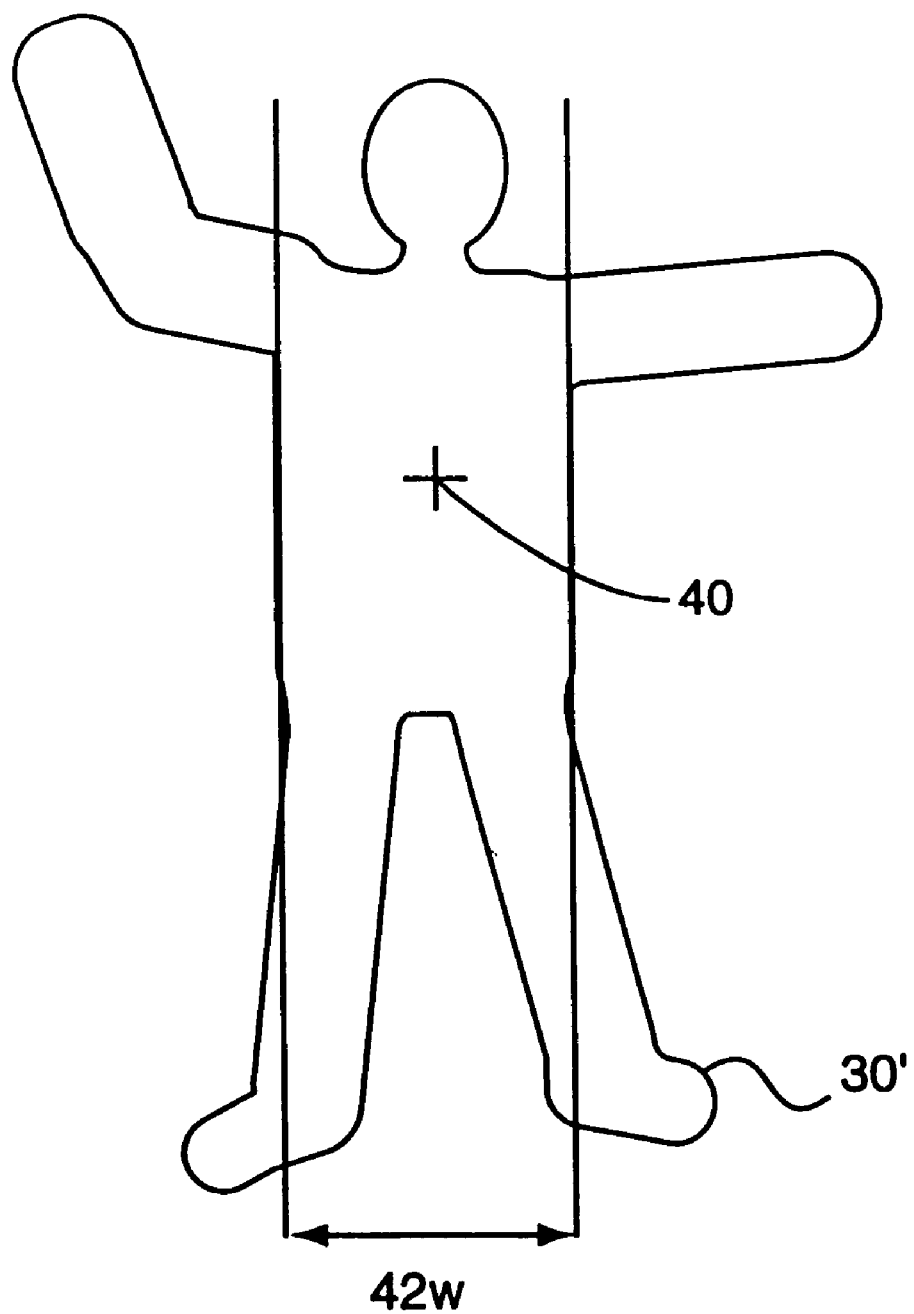
FIG. 5 is a diagrammatic plan view of an alpha image, in accordance with one embodiment of the present invention.

Generally, the method of background subtraction provides a subject alpha image 30' and a width of the body 42w, as depicted in FIG. 5. From subject alpha image 30' and width of the body 42w a center of body point 40 may be determined. Center point 40 may be obtained by determining the center of mass of all the alpha image points falling within the bounds of width 42w. Alpha image 30' is typically made up of points or pixels representing the position and location of subject 30 within the electronic image. Points or pixels within alpha image 30' are typically given a value of 1, while the rest of the points within image 10 are zeroes. However, any suitable type of valuation of the alpha image points may be utilized in accordance with the present invention.

FIG. 6 illustrates a table of body ratios associated with one embodiment of the present invention. In the described embodiment of the present invention, the body ratios are applicable to typical human beings. The body ratios may be used to estimate different characteristics of subject 30, in the exemplary embodiment of the present invention subject 30 being a human being. However, body ratios of different types of subjects, such as animals, insects, birds, or other living creatures may be similarly used in accordance with the present invention.

Further, if more precise ratios are available, they may be used in accordance with the present invention to provide greater accuracy. By way of example, subjects that fall into more specific categories of body types may have more defined ratios, which may provide better results. Generally, any type of additional information about subject 30 provides greater accuracy. But, one of the advantages of the present invention is that precise information, which may be impractical to obtain for every subject, is not necessarily needed.

Additionally, more specific ratios may be used for non-living animate objects where the precise ratios are already known. By way of example, if object 30 was a robotic arm where the dimensions of the arm were precisely known, the ratios of the robotic arm may be used to obtain the characteristics of the arm from an electronic image.

By determining one characteristic of subject 30 other characteristics may generally be estimated. While the estimations may not be precise estimations, the estimations often provide a good starting point for deriving the true dimensions of the desired characteristic. Additionally, the estimation allows for eliminating a large number of potential sizes, shapes and poses that would have been otherwise necessary to compare against the current image of the subject.

By way of example, if subject 30 is a typical human male, e.g., a male with dimensions that fall in the average male category of sizes, the sizes of a large number of body parts may be estimated based upon the body width, or shoulder width, of subject 30. If the body width of subject 30 is 25 inches, the head width to shoulder width (HW/SW) ratio may then be used to obtain an estimate of the head width. Using the appropriate ratio, the estimate for the head width of subject 30 is approximately 8.44 inches. Again, it should be appreciated that any type of body ratios may be used for the applicable type of subject 30.

FIG. 7 illustrates the alpha image 30' of FIG. 5. Once one of the characteristics of subject 30 is obtained through alpha image 30', the characteristic may be utilized in conjunction with the known body ratios to obtain other characteristics of subject 30. Using alpha image 30' and width 42*w*, other characteristics of subject 30 may be obtained.

In one embodiment of the present invention, it may be desired to obtain a height 42*h* of the body of subject 30. An estimate of the height of the body 42*h*(0), may be obtained by using the body ratios in FIG. 6. Specifically the ratio of body width to upper body height may be used. Estimate height 42*h*(0) may be centered around center point 40 within the bounds of width 42*w*. The points or pixels within alpha image 30' contained within the estimated height 42*h*(0) and width 42*w*, may be counted to determine whether that is the best estimate of the body box 42. Further estimated heights 42*h*(1) through (n), may be made, and the points within the estimated boxes counted. The number of points in each of the estimated boxes may then be compared to determine the best estimate of a body box 42.

Obtaining the number of points within body box 42, or obtaining a "score," may be accomplished by several different methods. In one embodiment, the number of points in estimated body box 42(*n*) relative to the total number of points in alpha subject image 30', may provide the score for the estimated body box. In another embodiment, the number of points in the estimated body box may be compared to the number of points within body width 42*w* to obtain the score for the estimated body box. In still a another embodiment, the number of points in estimated body box 42(*n*) in relation to the total number of possible points within body width 42*w*, that is, points in empty spaces, may be used to determine the score for the estimated body box. Again, the estimated body box with the best score may be used as body box 42.

FIG. 8 illustrates the alpha image 30' of FIG. 7 with a head box 44. Head box 44 includes a width 44*w* and a height 44*h*. Typically, the dimensions of head box 44 may be determined by computer vision system 26.

Head width 44*w*, in one embodiment of the present invention, may be determined using the body ratios of FIG. 6 and the values for the body height 42*h* and/or width 42*w*. In another embodiment, a scan may be performed to determine width 44*w*. By way of example, an estimated height 44*w*(0), derived by the body ratios and the measurements for body box 42, may be used as the first estimate of head width 44*w*. Centering estimated head width 44*w*(0) about an axis vertically extending from body center point 40, a score may be obtained for the estimated head width. Once again, estimated head width 44*w*(*x*) with the highest score may then be used as head width 44*w*.

Similarly, head height 44*h* may be obtained by either using the body ratio or the scan method. Head height 44*h* may be directly obtained from head width 44*w* by using the body ratio head height-to-head width as shown in FIG. 6. In another embodiment of the present invention, the head height may be scanned and a best estimate may be obtained for head height 44*h*. As will be appreciated by those skilled in the art, the head height or the head width may be estimated in any suitable order.

In an alternative embodiment, head height 44*h* may be initially obtained using the prior body dimensions and head width 44*w* derived from head height 44*h*. It has been observed that, due to the characteristics of the human head, head width 44*w* may be more readily determined from head height 44*h*. Therefore, it may be desired to obtain head height 44*h* prior to obtaining head width 44*w*.

Figure 9:
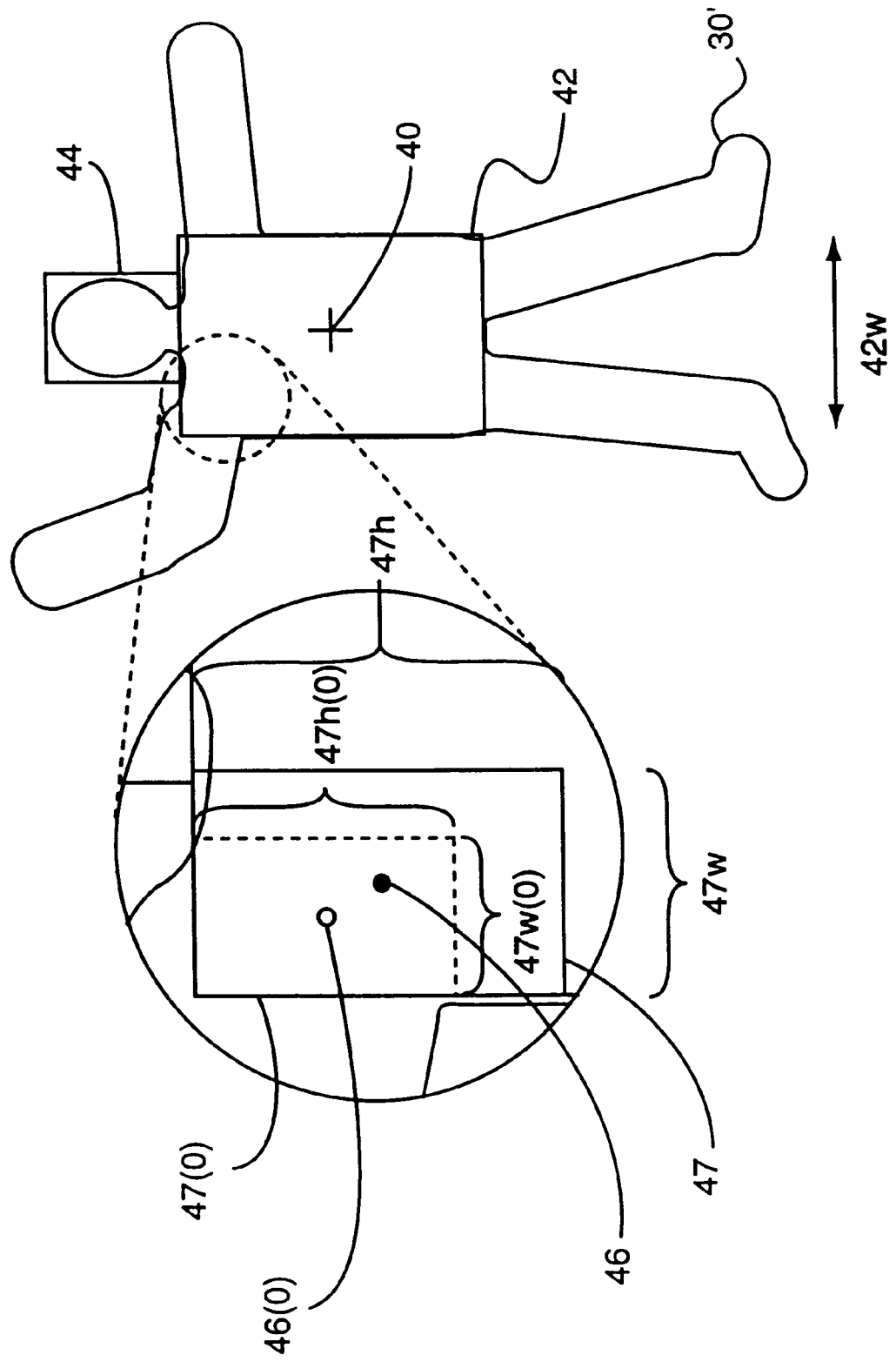
FIG. 9 illustrates the alpha image of FIG. 8 including a shoulder box and a shoulder point in enlarged view, in accordance with one embodiment of the present invention.

After body box 42 and head box 44 have been determined, further characteristics of subject 30 may be obtained. FIG. 9 depicts alpha image 30' of FIG. 8 including a shoulder box 47 and a shoulder point 46 in an enlarged view. Shoulder box 47 typically includes a height 47*h* and a width 47*w*. In one embodiment, the dimensions for a shoulder box 47 may be obtained from body ratios and previously determined characteristics of subject 30. Typically, shoulder box 47 is then placed in the appropriate corner of body box 42 to indicate the location of the shoulder of subject 30. Shoulder point 46 may then be placed in the center of shoulder box 47.

In another embodiment, the dimensions for shoulder box 47 may be determined by the scanning method previously discussed. An estimate for shoulder box 47(0) may be made and placed in the appropriate corner of body box 42. A score may then be obtained for the number of points located within estimated shoulder box 47(0). Accordingly, the dimensions 47*w* and 47*h* may be adjusted to determine further estimates of shoulder box 47. Typically an estimated shoulder point 46(0) is located in the center of estimated shoulder box 47(0), and further estimates of shoulder point 46 will be appropriately placed in the centers of the estimated shoulder boxes.

In the determination of shoulder box 47 and other irregular types of characteristics of subject 30, the highest score may not necessarily be the best score. As illustrated in FIG. 9, by increasing the height and width 47*h* and 47*w* of the estimated shoulder box, a number of points within the estimated shoulder box also increases. To avoid obtaining a shoulder box that may encompass almost all of body box 42, an analysis of the scores of the estimated shoulder boxes may be performed. In the illustrative embodiment, the range of width 47*w* and height 47*h* estimates are typically limited. In another embodiment, a derivative may be taken of the curve created by the scores of the estimated shoulder boxes versus either the height of shoulder box 47*h* or the width of the shoulder box 47*w*, or both, showing the rate of change of the scores. A characteristic feature of the curve (e.g., a maximum, a minimum, or an inflection point) may then be selected to determine the best shoulder box.

Figure 10:
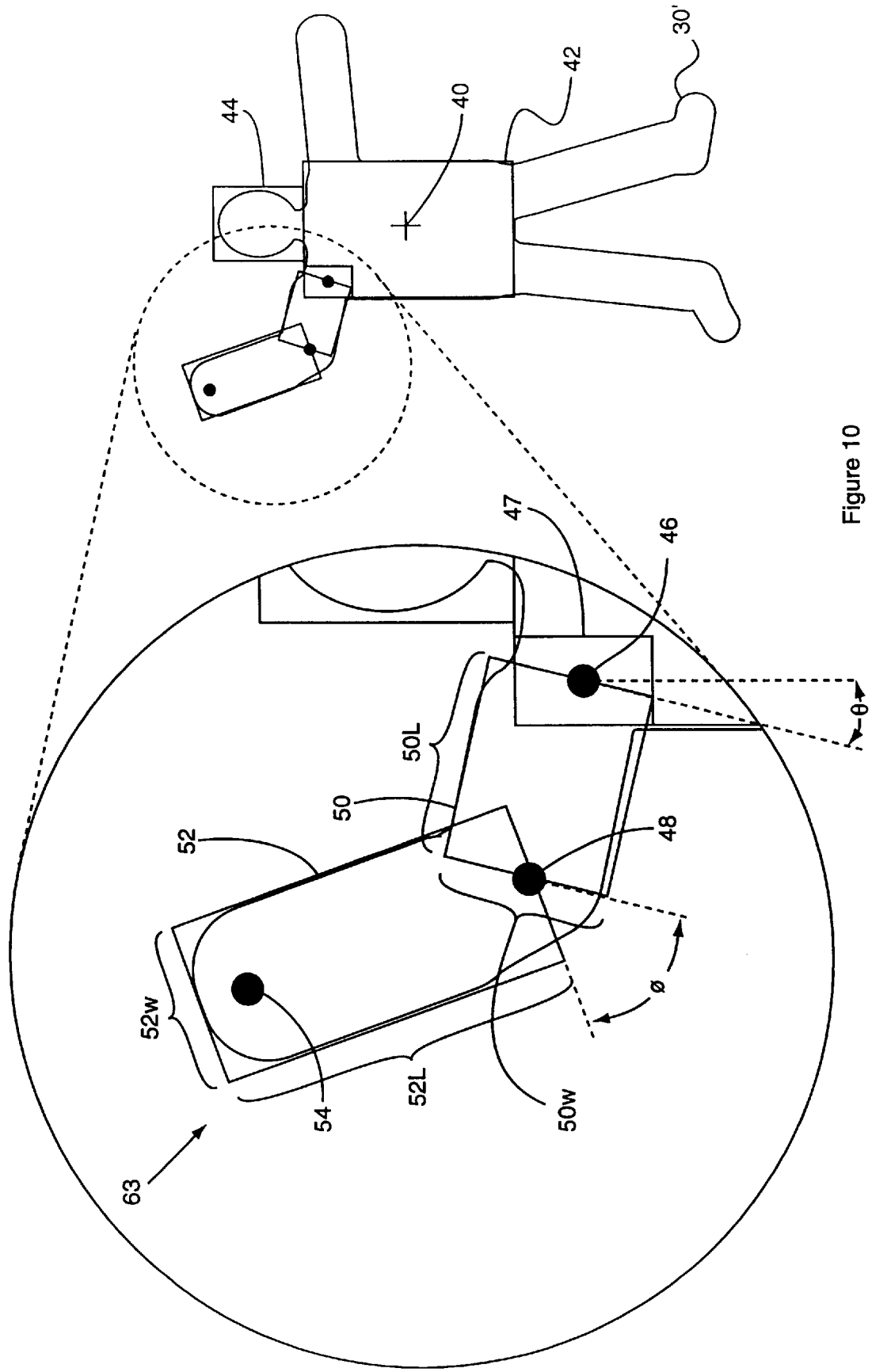
FIG. 10 is an enlarged view of an arm of an alpha image, in accordance with one embodiment of the present invention.

Shoulder point 46, after being determined, may then be the starting point for determining the dimension of an arm box 50, a forearm box 52, an elbow point 48, and a hand point 54, as depicted in FIG. 10 in enlarged view. Additionally, the angle at which the arm and forearms are bent may also be determined. An arm angle θ indicates the angle at which arm box 50 is bent relative to a vertical axis extending from shoulder point 46. A forearm angle ø is the angle between arm box 50 and forearm box 52. Typically, elbow point 48 is placed at the midpoint of the outer width of arm box 50. Elbow point 48 also joins arm box 50 with forearm box 52 at the midpoint of the width of forearm box 52 adjacent to arm box 50. Forearm angle θ may then be measured by the angle created between arm box width 50w and forearm box width 52w coupled by elbow point 48.

In one embodiment, the various dimensions of forearm box 52 and arm width 50w may be derived from an arm length 50L using the body ratios. However, arm length 50L, angle Ø and angle θ must be determined independently. Each combination of a particular arm length 50L and angles Ø and θ is typically called a pose 63. In prior art systems, an exhaustive scanning technique is not uncommon to determine the best pose 63, and best estimates for arm length 50L, angle Ø and angle θ.

As will be appreciated by those skilled in the art, exhaustively scanning all the potential poses of the arm of object 30 may require a significant amount of computational resources. Additionally, real time subject characterization may not be possible in prior art methods. In the present invention, a large number of iterative steps may be eliminated without significantly degrading recognition qualities.

Figure 11:
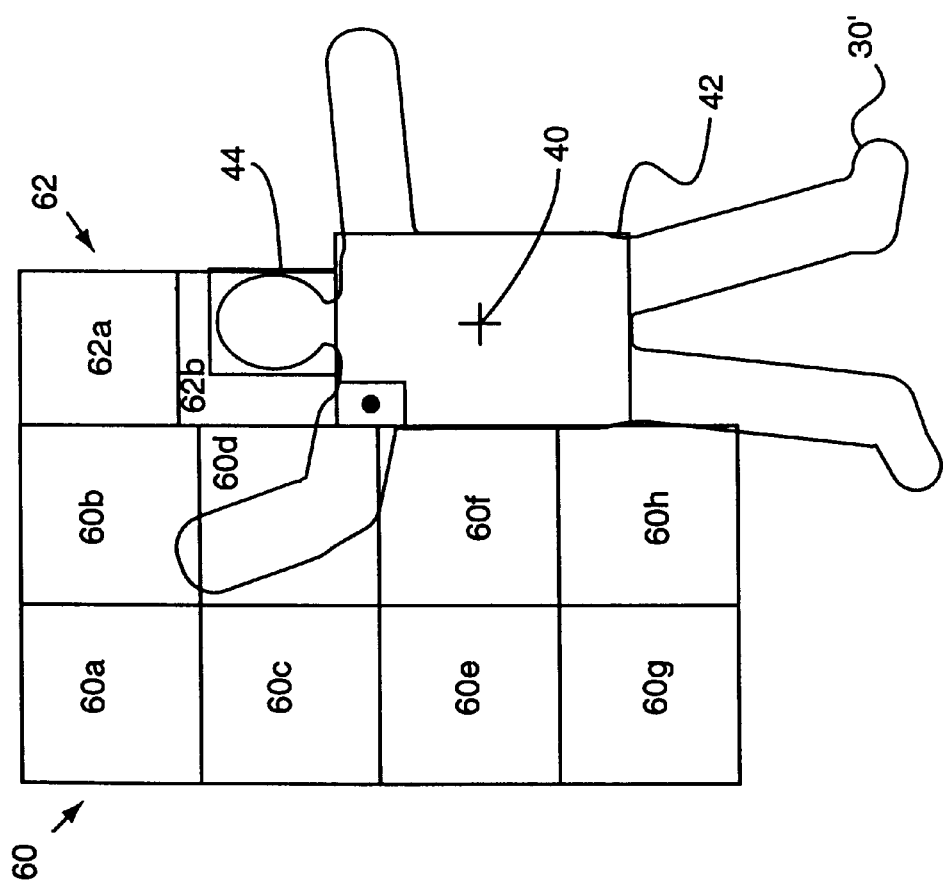
FIG. 11 illustrates the alpha image of FIG. 7 with bounding boxes, in accordance with one embodiment of the present invention.

FIG. 11 illustrates alpha image 30' of FIG. 7 with bounding boxes 60 and 62. Bounding box 60 is typically located adjacent to the appropriate side of body box 42, as illustrated. Bounding box 62 may be located directly above body box 42 and may or may not encompass head box 44. The dimensions for bounding box 60 may be determined by the maximum estimated length of the arm of subject 30. The maximum estimated length of the arm of subject 30 is typically equal to the maximum estimated length of arm box 50L and the maximum estimated length of forearm box 52L. Thus, a width of bounding box 60 is typically equal to the maximum of 50L plus 52L, and a height of bounding box 60 is typically two times the value of the width of bounding box 60. Bounding box 60 is then typically centered around a horizontal axis extending from shoulder point 46.

In one embodiment, bounding box 60 is divided into segments 60a through 60h. Similarly, bounding box 62 may be segmented as well into segments 62a and 62b. Bounding boxes 60 and 62 typically encompass all the areas in which the arm of subject image 30" may be located within the electronic image. Thus, bounding boxes 60 and 62 have already narrowed the search required to characterize the arm of subject 30 by eliminating the rest of the electronic image including the rest of the body of subject 30.

Further optimization may be performed in accordance with one embodiment of the present invention. An initial scan of segments 60a through 60h may be made to determine the number of points located in each box. By way of example, in FIG. 11, segments 60a, 60c, 60e, 60g, and 60h do not include any points. Thus, those segments may be discarded and the characterization of the arm may be focused entirely in the remaining segments 60b, 60d and 60f. While segments 60a, 60c, 60e, 60g and 60h were discarded for having no points, any suitable threshold may be used to discard "empty" segments. By way of example, if the entire arm of alpha image 30' contains 200 points, segments containing less than 10 points, or 5%, may be discarded. However, any percentage or number may be used as a threshold in accordance with the present invention.

A similar process for bounding box 62 may be utilized to eliminate segments that do not contain any valid points. However, a segment of bounding box 62 may contain head box 44. In order to avoid mistaking points related to head box 44 for the arm, the number of points in head box 44 may be subtracted from the number of total points located in segment 62b in order to determine whether the segment is "empty" or not. In the illustrated example, segment 62 and 62b would be considered empty and discarded for purposes of characterizing the arm of alpha image 30'.

FIGS. 12 and 12b are enlarged views of the arm of alpha image 31' as shown in FIG. 11. In order to determine the remaining characteristics of the arm of alpha image 31', a search is done of all the potential combinations of arm length 50L, arm angle θ, and forearm angle Ø. As discussed, only arm length SOL is required, since the other dimensions of forearm box 52 and arm box 50 may be derived from arm length 50L. By eliminating all the "empty" bounding box segments, only the potential combinations of arm length SOL and angles θ and Ø that locate the arm within the remaining segments, 60b, 60d and 60f, need be checked.

As a first estimated pose 63(0), arm length 50L(0) and angles θ(0) and Ø(0) determined for the position of the arm of alpha image 30' in the prior electronic image may be used as a first estimate for the current image.

In one embodiment, several electronic images taken at different times of subject 30 may have been previously characterized by computer vision system 26. The previous combination of arm length 50L and angles θ and Ø, were the pose of the arm of subject 30 may be used as a starting point for determining the current pose of the arm. By way of example, the previous images pose defined by arm box 50(0) forearm box 52(0), θ(0), and Ø(0) maybe scored and that score used as the current best score in order to compare against the estimated poses 63(0)–63(n).

FIG. 12a depicts the last and best pose of the previous electronic image, which contains a combination of arm box 50(0), forearm box 52(0), and angle θ(0) and forearm angle Ø(0) that places the arm into a currently empty segment 60e. In one embodiment, the score for the last frame's best pose 63(0) may be discarded because it does place the arm into an empty box. However, in an alternate embodiment, the score for the last frame's best pose 63(0) may still be used as a starting point for measuring successive estimates for the current pose. By way of example, the number of points in segments 60b, 60d, and 60f may total 300 points. The score for the last frame's pose 63(0) may then be equal to 204 out of the 300 points. The 204/300 score obtained by the previous frame's pose may then be used as the current best score to be compared against the estimated poses that follow.

FIG. 12b illustrates alpha image 30' of FIG. 12 with an estimated pose 63(3). The new estimated pose 63(3) includes an estimate of arm box 50(3), an estimate of forearm box 52(3), an estimate of arm angle θ(3) and an estimate of forearm angle Ø(3). Estimated pose 63(3) is typically one of the many poses that fall within the confines of remaining segments 60b, 60d, and 60f.

In one embodiment, all the potential estimated poses that fall within the confines of segment 60b, 60d, and 60f may be scored in order to obtain the best estimated pose. In the illustrated example, the score for estimated pose 63(3) may be equal to 45 points out of the total 300 points possible. Comparing the score for estimated pose 63(3) to the initial estimated pose 63(0) which used the last frame's pose, the new estimated pose 63(3) may be rejected since its score is lower than the score for the initial estimated pose 63(0).

If the score for estimated pose 63(3) in larger than the current best score, which was obtained by estimate 63(0), then the score for estimated pose 63(3) would become the new current best score. In this manner all the potential poses that fall within segment 60b, 60d, and 60f can be scored and compared to obtain the pose with the best score. Typically, the estimated pose with the best score would then be chosen as the new pose for characterizing subject 30. However, other criteria can be introduced to select the best possible pose, as discussed further below.

In another embodiment, certain estimated poses may be rejected without having to complete an entire scan. By way of example, during the process of scoring estimated pose 63(3) it may be determined that estimated pose 63(3) will not be able to achieve a score higher than the current best score. The scanning and scoring of estimated pose 63(3) can initially begin at any point within the estimated pose. Assuming the scan begins at a point within arm box 50(3) closest to body box 44, computer vision system 26 will begin accumulating the score for estimated pose 63(3). Initially computer vision system 26 may begin counting all the points that fall within estimated pose 63(3), thereby counting up all the points located in region 59.

In the illustrated example, after computer vision system 26 has counted up all the points in region 59, amounting to 45 points, computer vision system 26 will then encounter only empty points and will not accumulate further points. At a certain point computer vision system 26 will be able to determine that the rest of the remaining points to be scanned in estimated pose 63(3) will not be able to contain a sufficient amount of points to bring the total score above the current best score.

In the illustrated case, once computer vision system 26 has counted up over 142 points with only a score of 45, computer vision system 26 may determine that the remaining 158 potential points added to the current score of 45 will not equal 204 points or greater. At that point computer vision system 26 may be able to abort the rest of the scan of estimated pose 63(3) because it is incapable of becoming the best estimated pose. In one embodiment, computer vision system 26 may compare the current score of estimated score 63(3) plus the remaining points left to scan in estimated pose 63(3) versus the current best score to determine if the estimated pose 63(3) is capable of surpassing the current best score. However, it can be appreciated, that any suitable type of threshold comparison may be used in accordance with the present invention. Additionally, other factors may be used to determine the best score, and thereby the best pose, in addition to simple scoring.

Figure 13:
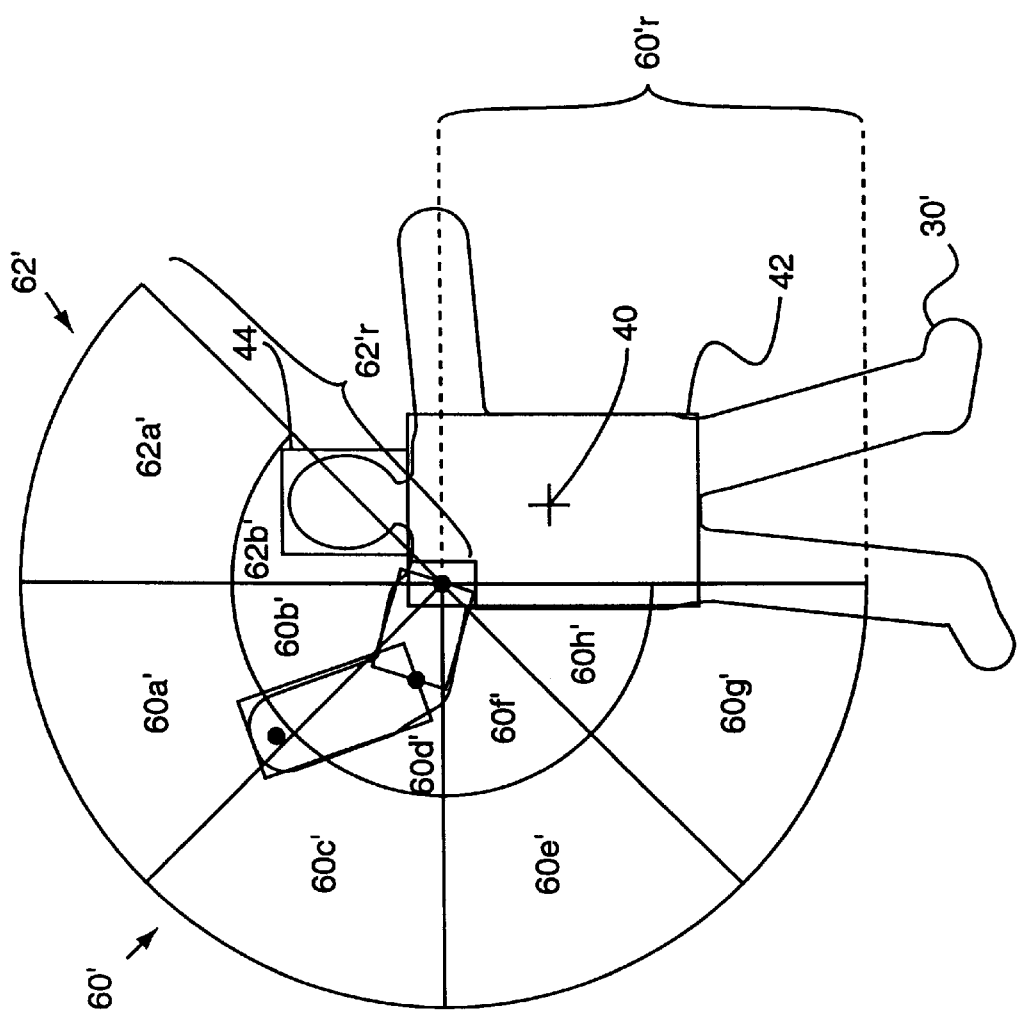
FIG. 13 illustrates the alpha image of FIG. 11 with radial bounding boxes, in accordance with one embodiment of the present invention.

Also, a variety of different types of scoring and utilization of bounding boxes may be utilized in accordance with the present invention. For example, FIG. 13 illustrates alpha image 30' of FIG. 11 with radial bounding boxes 60' and 62'. Bounding box 60' has a radius 60'r. Radius 60'r may be determined in a similar fashion to the determination of the width of bounding box 60, as discussed above.

In one embodiment, radius 60'r is equal to the maximum length of the arm of subject 30, which is equal to the maximum estimate for arm box length 50L and forearm box length 52L. Thus, bounding box 60' covers the entire area in which the arm of subject 30 may be located. Bounding box 62' may also include a radius 62'r, the value of which may be equal to radius 60'r. Again, bounding boxes 60' and 62' are segmented such that the number of estimated poses may be reduced in subsequent scoring.

Similar to bounding box 62 in FIG. 11, bounding box 62' covers an area above the head of subject 30. Bounding box 62' includes segments 62' and 62b'. 62b' may include the area in which head box 44 also resides. Again the number of points located in the intersection between head box 44 and segment 62b' may be subtracted when determining whether segment 62b' should be discarded. Similarly, points located in body box 42 that intersect with bounding box segments 60h' and 60g' may be ignored.

In the illustrated embodiment, segment 60e', 60g', 62h' may be discarded since they are void of any relevant points. However, some of the other segments contain a number of points but may not contain a sufficient number to points to pass a threshold comparison. By way of example, segments 60a', 60b', 60c' and 60f' all contain points, but not necessarily enough points to be of significant concern. In one embodiment, if the threshold is set at ten percent of the point of all the points located in bounding box 60' then each remaining segment must contain at least 30 points in order to be considered in the scoring of the estimated poses.

For purposes of illustration, segments 60b' and 60f' may contain only 25 and 28 points, respectively. Therefore, those segments are discarded and only segment 60a', 60c' and 60d' remain having a combined 247 points out of the initial 300 points. Scoring then may proceed with the estimated poses that fall within the bounds of the remaining segments 60a', 60c' and 60d'.

It is possible that the potential poses that fall within segment 60a', 60c' and 60d' also overlap into areas of 60b', 60f' and 60h'. In one embodiment the points located in segment 60b' and 60f' are discarded in the scoring process and only the 247 points in segment 60a', 60c' and 60d' are considered in the scoring of the estimated poses. In another embodiment, however, the points located in 60b' and 60f' may also be included in the overall scoring when the estimated poses overlap into those segment, in which case the scoring is based on the 247 points of segment 60a', 60c' and 60d' and the points located in the overlapping segments 60b' and 60f'.

Using radial bounding boxes 60' and 62' helps to reduce the scan time of bounding boxes 60' and 62'. Thus, the determination of the total number of points in radial bounding boxes, as compared to bounding boxes 60 and 62, is made more efficient since the area of radial bounding boxes 60' and 62' are typically smaller than the areas of rectangular bounding boxes 60 and 62. Accordingly, any type of shape may be utilized as bounding boxes.

Alternatively, more than one type of bounding box may be used to do an initial scan of the total area in which the arm of subject 30 may be located. For example, radial bounding boxes 60' and 62' may not be the most efficient bounding boxes used since there were so many marginal bounding boxes that may or may not be discarded. Computer vision system 26 may determine that rather than throwing away the marginal bounding boxes 60b' and 60f' the use of rectangular bounding boxes 60 and 62 may be more appropriate. Thus, only three bounding boxes with no marginal bounding boxes may be checked while doing the scoring of the estimated poses as opposed to utilizing only three bounding boxes and having to deal with two marginal bounding boxes in the case of radial bounding boxes 60' and 62'.

Alternative forms of pose estimation may be performed in accordance with the present invention. FIG. 14 illustrates alpha image 30' of FIG. 9 overlaid on a summed area table 65. Summed area table 65 includes a number of points 65(x,y), each point representing a point or a pixel in electronic image 10. Typically, all the points in electronic image 10 are blank except for alpha image 30' which was extracted from the subject image 30" taken by camera 29.

A summed area table is generally a numerical representation of all the points in a given image. Each point 65(x,y) contains a number indicating the sum of points up to that point in summed area table. For example, starting from the upper left corner of summed area table 65 the first point 65(0,0) would have the value of zero since that point is empty or blank. The next point 65(1,0) would also have a value of zero since that point is also blank and the prior point was blank. However, if the first point was a filled point it would have a value of one. The next point 65(2,0) would also have a value of one if it were a blank point because the value for the second point would be a sum of the first and second point. If the second point 65(2,0) were the filled point then its value would be two, the sum of the values of the first and the second point.

After the first row is summed, the second row is summed. Points in the second row are arithmetically progressing sums of the points in the second row, similar to the first row. However, the sums of the points of the second row also include the value of the point immediately above each of the points of the second row. The following rows are summed in a similar manner, until the last point is reached.

A beneficial characteristic of summed area table 65 is that given four points of a rectangle within the summed area table 65 the number of points within that rectangle may be determined by the corner points. For example, given the four corner points 65(x1,y1) through 65(x4,y4) the number of points in the rectangle delimited by the four corner points may be determined by the values of the four corner points. Similarly, the number of points in a triangle or a line my be determined as well as other shapes.

In one embodiment, summed area table 65 is used to characterize the arm of subject 30. Initially a bounding box 66 with segments 66a through 66h may be created in a similar fashion to bounding boxes 60 and 62 as described above. However, instead of going through the iteration of comparing all of the potential poses, the use of summed area table 65 may greatly reduce the amount of computations needed to obtain the best estimated pose.

First, an initial scan of bounding box 66 may be performed to eliminate the empty segments, as was done in the previous exemplary embodiment. But rather than counting up all the points in the individual segments 66a through 66b to determine whether any points are located within those segments the properties of summed area table 65 may be utilized. By taking the four corner points of segment 66a it can readily be determined that it does not contain any points without having to go through each individual point of 66a. The same can be done for all segments 66a through 66h, returning with the result that only segments 66b, 66d, and 66f contain any relevant points. Further refinement using the summed area table 65 may then be performed.

Figures 14A, 14B:
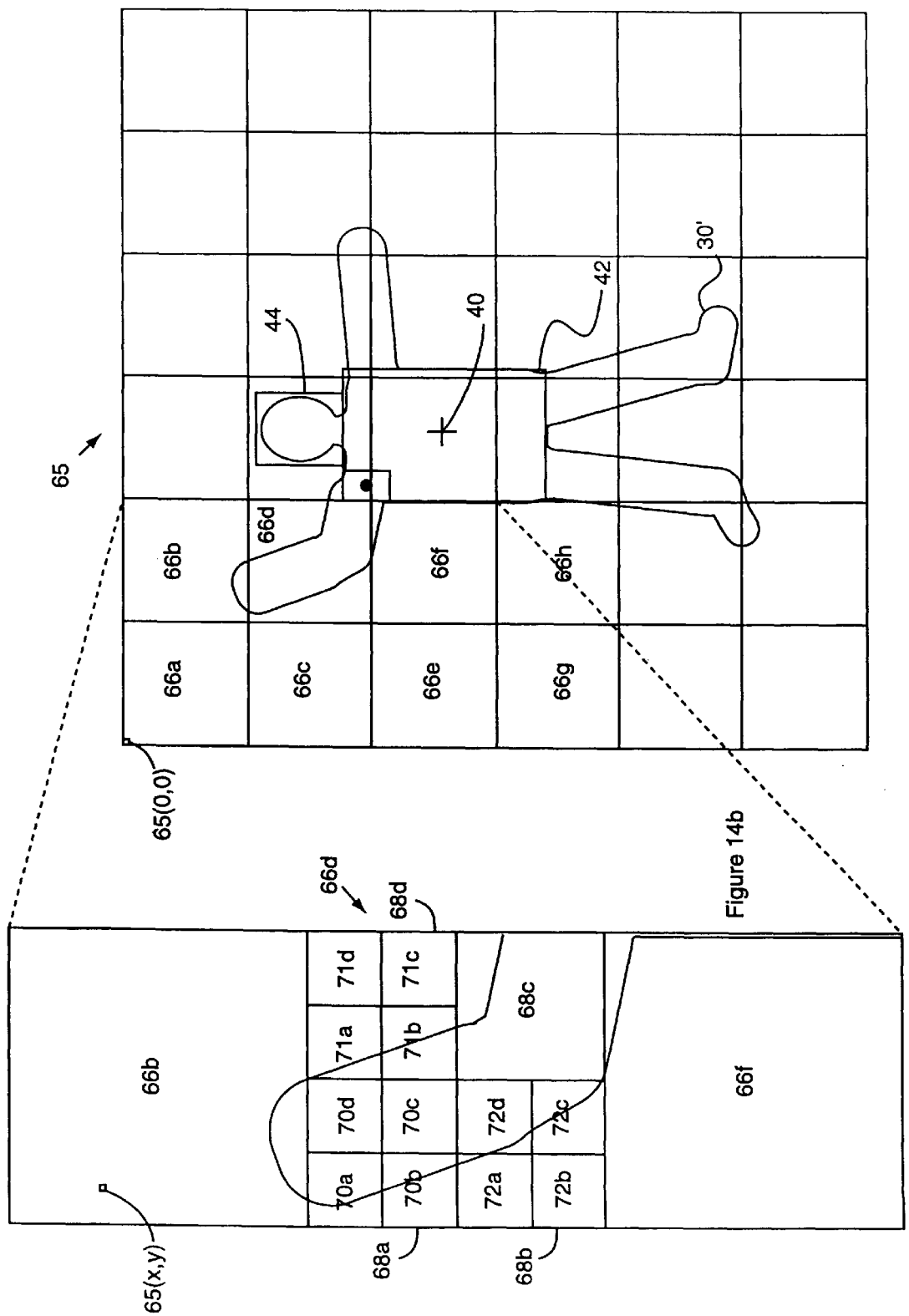
FIG. 14a illustrates the alpha image 30' of FIG. 9 overlaid on a summed area table, in accordance with one embodiment of the present invention.
FIG. 14b is an enlarged view of a portion of FIG. 14.

FIG. 14b illustrates an enlarged view of segments 66b, 66d, and 66f of FIG. 14. Bounding box segments 66b, 66d and 66f may be further segmented into subsegments 68a–68d. The number of points in subsegments 68a–68d may be determined using the summed area table.

Subsegments 68a–68d may be segmented into further subsegments 70a through 70d, 71 a through 7 id and 72a through 72d. Using the four corner points of subsegments 70a through 70d, 71 a through 72d, and 72a through 72d, the number of points located in each subsegment may be determined again, the subsegment containing no points or a low number of points below a predetermined threshold may be discarded. At this point scoring may proceed using a reduced number of estimated poses that fit in the remaining subsegment. In another embodiment further segmentation may be performed in order to further reduce the number of estimated poses that fall within the bound of the valid segment. The amount of segmentation may be optimized in order to reduce the number of computations of segments and the number of estimated poses that remain to obtain the best pose for image 30'.

Figure 15:
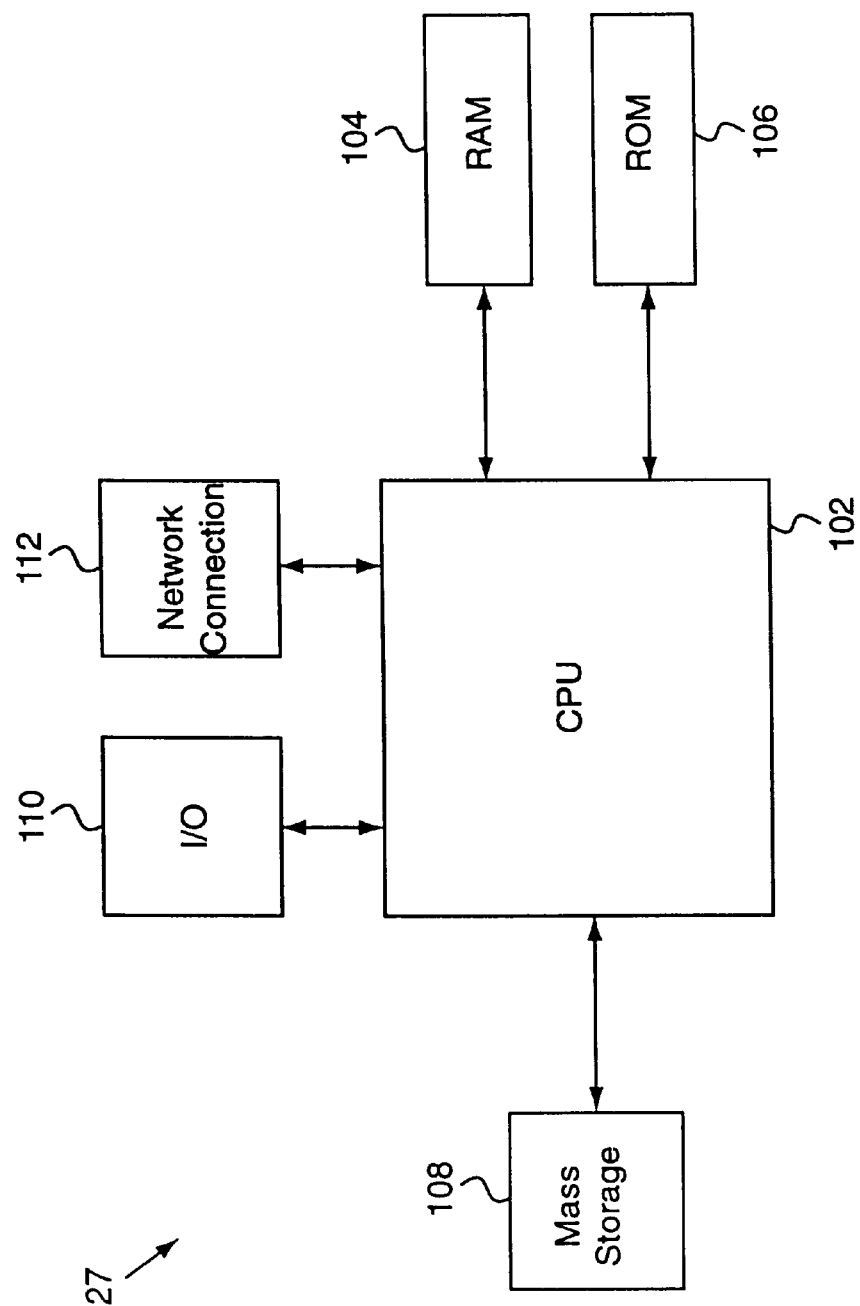
FIG. 15 is a schematic illustration of a general purpose computer system, in accordance with one embodiment of the present invention.

FIG. 15 is a schematic illustration of a general purpose computer system suitable for implementing the process of the present invention. The computer system includes a central processing unit (CPU) 102, which CPU is coupled bi-directionally with random access memory (RAM) 104 and unidirectionally with read only memory (ROM) 106. Typically RAM 104 includes programming instructions and data, including text objects as described herein in addition to other data and instructions for processes currently operating on CPU 102.

ROM 106 typically includes basic operating instructions, data and objects used by the computer to perform its functions. In addition, a mass storage device 108, such as a hard disk, CD ROM, magneto-optical (floptical) drive, tape drive or the like, is coupled bi-directionally with CPU 102. Mass storage device 108 generally includes additional programming instructions, data and text objects that typically are not in active use by the CPU, although the address space may be accessed by the CPU, e.g., for virtual memory or the like.

In one embodiment of the present invention, the operations of computer vision system 26 may be stored on a computer readable medium. The stored operations may then be implemented on computer 27. Computer readable medium may be an suitable medium capable of holding information that may be transferred to a computing device. By way of example, computer readable medium may be a floppy disk, a memory chip, a CD ROM, a floptical disk, a tape, a DVD disk, a hard disk, a memory source coupled to computer system 27 through a network or any other suitable medium.

Each of the above described computers further includes an input/output source 110 that typically includes input media such as a keyboard, a monitor, pointer devices (e.g., a mouse or stylus), a camera, a scanner, and the like. Each computer may also include a network connection 112 over which data, including, e.g., text objects, and instructions can be transferred. Additional mass storage devices (not shown) may also be connected to CPU 102 through network connection 112. It will be appreciated by those skilled in the art that the above described hardware and software elements are of standard design and construction.

Figure 16:
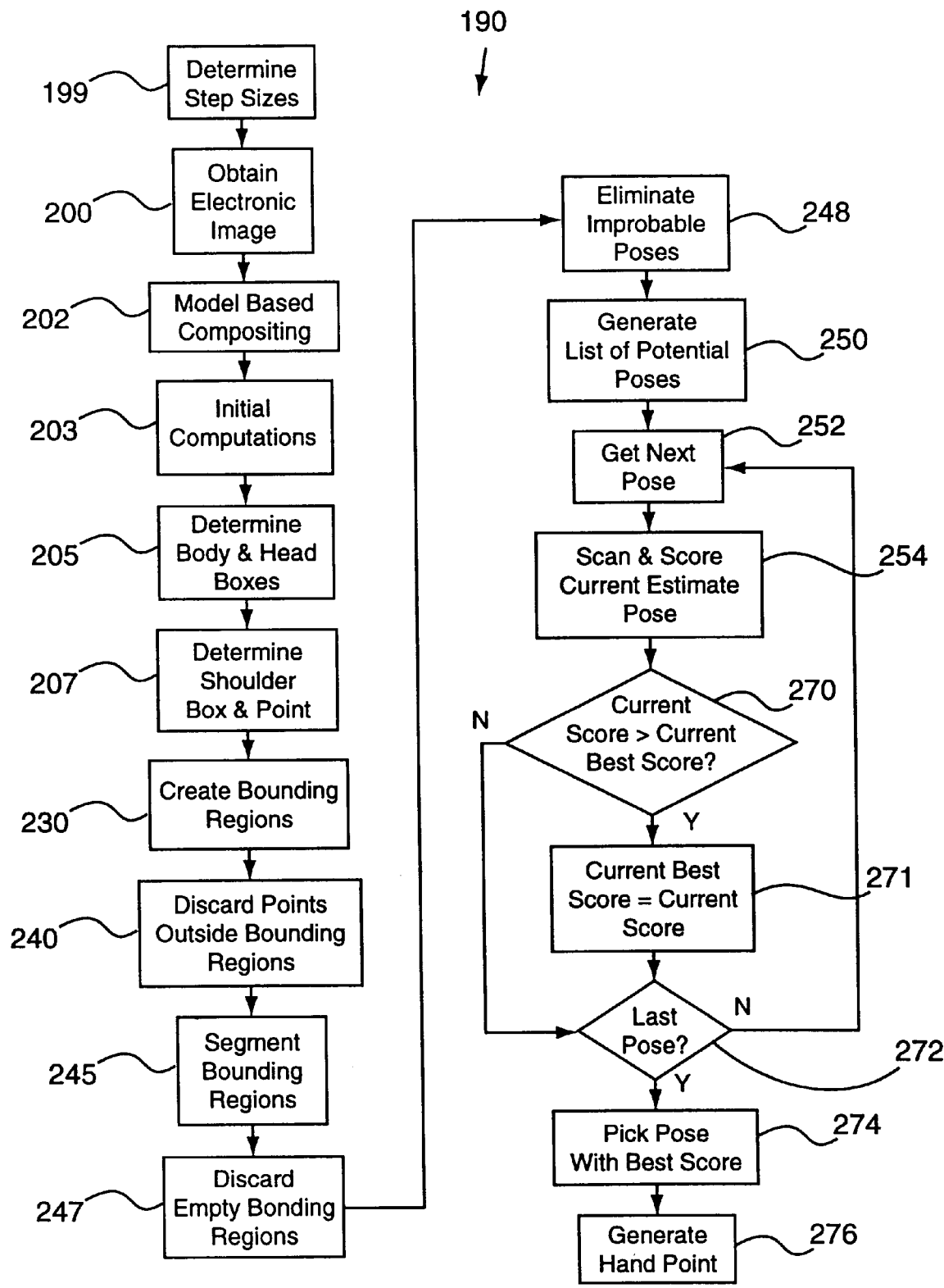
FIGS. 16, 17, and 18 are diagrammatic flow charts of the process of characterizing a subject, in accordance with one embodiment of the present invention.
Figure 17:
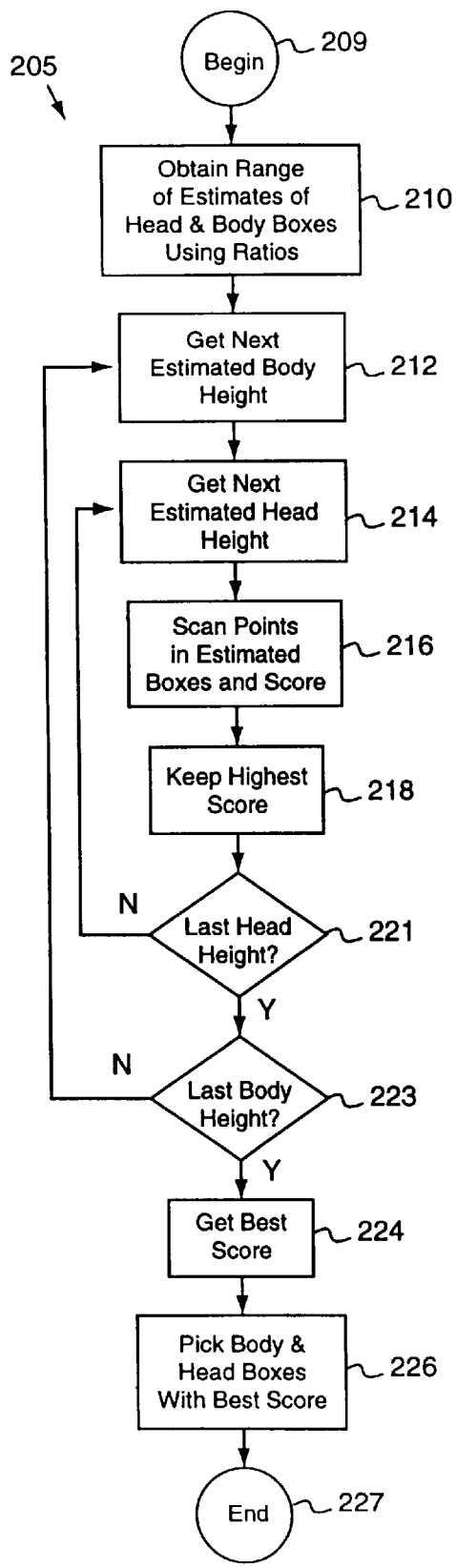
Figure 18:
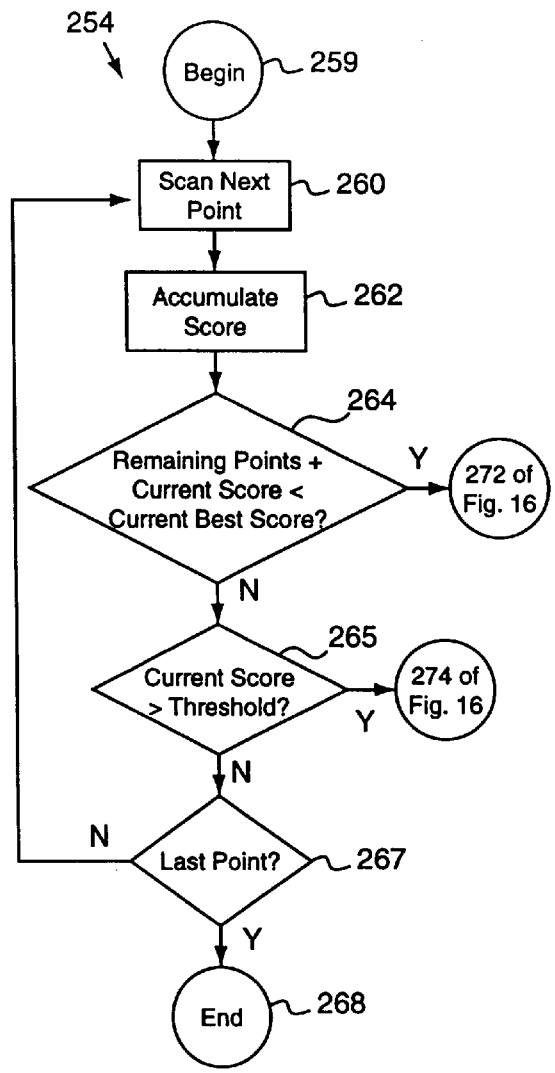

FIGS. 16, 17, and 18 are diagrammatic flow charts of the process of characterizing a subject, in accordance with one embodiment of the present invention. A flow chart 190 of the operations of computer vision system 26 begins in block 199.

In block 199 many of the initial parameters for subject characterization are initialized. Typically, the step sizes for arm length 50L and angles θ and Ø are set at predetermined values, depending on the desired accuracy of characterization. For example, if the method of estimating poses as described in relation to FIG. 11 and bounding boxes 60 and 62 were utilized, one set of values may be used for arm length 50L and angles θ and Ø. However, if the summed area table method for estimating a pose were utilized, as discussed in reference to FIGS. 14a and 14b, a different set of values for arm length 50L and angles θ and Ø may be used.

Typically, the summed area table method may result in a fewer number of estimated poses to be scanned and scored, if the same values for arm length 50L and angle θ and Ø were used, than the bounding box method as discussed in reference to FIG. 11. Therefore, smaller step sizes for arm length 50L and angles θ and Ø may be used along with the summed area table method of characterizing a pose 63 and still be able to obtain real time results. Thus, the greater number of estimated poses that can be eliminated the greater the resolution that may be obtained in the subject characterization process.

Other considerations may generally be taken into account in block 199. For example, if the general size, age, gender and other relevant characteristics are known about subject 30, then that information may be taken into consideration to choose the appropriate body ratios in the following process. After all the available and relevant information about subject 30 and the type of subject characterization to be performed is entered into computer vision system 26, process flow would then proceed to block 200.

In block 200 computer vision system 26 obtains an electronic image of subject 30 and any coincidental background around subject 30. Again, substantially any type of electrical imaging device may be used to obtain the electronic image of subject 30. After the electronic image is obtained, model based compositing is performed in block 202. Model based compositing provides computer vision system 26 with an alpha image 30'. In addition to the alpha image, body width 42w is typically also provided by the model based compositing procedure.

Initially, in block 203, computer vision system 26 may perform some initial computations. By way of example, computer vision system may compute center of body point 40 from the alpha image and body width 42w. Center of body point 40 may be calculated by deriving the center of mass of all the alpha image points that lie within the bounds of body width 42w. In an alternative embodiment, center point 40 may be computed in later operations, as needed. By way of example, center point 40 may be determined within the operations of block 205, as will be discussed further below.

Also, in block 203, computer vision system 26 may wish to compute summed area table 65 for alpha image 30'. In another embodiment, the computation of summed area table 65 for alpha image 30' may be accomplished in the model based compositing operations of block 202. Summed area table 65 may be used in the processes of scanning and scoring estimated poses that follow.

From step 202, process flow proceeds to block 205 to determine the body box and head box 42 and 44, respectively, using the information provided by the model based compositing, and center point 40. The operations of block 205 are discussed in further detail in reference to FIG. 17, below.

After body box 42 and head box 44 are determined computer vision system 26 proceeds to block 207 in order to obtain the characteristics of shoulder box 47 and shoulder point 46. Once again, shoulder box 47 may be determined strictly by the ratios related to subject 30, an example of which is depicted in FIG. 6. In an alternate embodiment, the characteristics of shoulder box 47, i.e. shoulder box width 47w and shoulder box height 47h, may be determined by the scanning and scoring method described in reference to FIG. 9. After shoulder box 47 and shoulder point 46 have been determined computer vision system 26 proceeds to block 230.

In block 230 computer vision system 26 creates bounding boxes in the areas in which the computer vision system is interested in. In one embodiment, using the previous example of a human subject and its alpha image 30', it may be desired to obtain the characteristics of the arm of alpha image 30'. In which case bounding boxes may be placed to the left of body box 42 to cover the area in which the arm of alpha image 30' may be located. Again, any type, size and number of bounding boxes may be utilized to sufficiently cover the area in which the arm of alpha image 30' may be located.

The bounding boxes may be sized and located according to the characteristics of the subject that is being characterized. By way of example, in the embodiment illustrated in the previous figures, one constraint was that the points located in head box 44 were ignored. Similar types of constraints may be used to size and locate the bounding boxes according to the subject being characterized. For example, in one embodiment, computer vision system 26 may be used to characterize a tentacle of an octopus. In which case, one constraint may be to locate the bounding boxes radially from the body box of the octopus at predetermined angles. It may be appreciated, that may different types of constraints related to any given subject may be used in accordance with present invention.

Once the bounding boxes are sized and located in order to properly characterize subject 30 the number of points located in the bounding boxes are counted up in block 240. The number of points in the bounding boxes may then be used in the scoring process of the various estimated poses. Proceeding to block 245, the bounding boxes are divided into segments. Then in block 247 computer vision system 26 discards all of the empty segments. Once again the criteria for determining whether a segment is empty need not necessarily be that the segment is completely devoid of points. As discussed a threshold may be set to determine whether a segment is "empty". By way of example, setting a threshold of two percent of all the points located in all the bounding boxes as a threshold for the number of points that must be located within a segment in order for the segment not to be discarded may be used. Accordingly, any percentage or threshold may be set in accordance with the present invention.

Having eliminated all the empty segments in the bounding boxes computer vision system 26 may then proceed to determine all the potential poses that correspond to the areas covered by the remaining segments, in block 248. Typically all possible combinations of arm length 50L and angles $\theta$ and $\varnothing$ are stored in computer vision system 26. In one embodiment, the combinations of arm length 50L and angles $\theta$ and $\varnothing$ may be normalized. The normalized characteristics 50L, $\theta$ and $\varnothing$ may then be scaled according to alpha image 30'. By way of example, characteristic 50L, $\theta$ and $\varnothing$ may be normalized according to an average height male. If the values for body width 42w provided by model based compositing and center point 40 indicates a larger person the normalized values for 50L, $\theta$ and $\varnothing$ may be appropriately scaled. However, the scaled characteristics 50L, $\theta$ and $\varnothing$ may be further varied during the scanning and scoring process.

Once all the improbable poses are eliminated in block 248 computer vision system 26 generates a list of the potential poses in block 250. Additionally, in block 250 computer vision system 26 may score the last frame's best pose in order to generate a current best score. Typically, such a characterization is performed in real time operation where multiple electronic images are captured at specified time intervals. By using information obtained in a previous electronic image the number of estimated poses that must be scanned and scored in the current electronic image may be reduced. Thus, in one embodiment, the pose determined in the previous electronic image may often time be a good indicator of the current pose.

After obtaining a current best pose utilizing the previous electronic image's pose computer vision system 26 may proceed to score the next pose the list of potential poses in block 252. In block 254 computer vision system 26 proceeds to scan the points located within the current estimated pose, as discussed in further detail in reference to FIG. 18. Once a score is obtained in block 254 computer vision system 26 proceeds to block 270.

In block 270 computer vision system 26 compares the score of the current estimated pose with the current best score. If the score of the current estimated pose is greater than the current best score computer vision system 26 proceeds to block 271 and stores the current estimated pose's score as the new current best score. If the score of the current estimated pose is not greater than the current best score then computer vision system 26 can proceed to block 272. Block 272 determines whether the current estimated pose is the last of the potential poses. If there are more potential poses to be scanned and scored computer vision system 26 returns to block 252 to analyze the next pose. If a new current best score was obtained in block 271 computer vision system 26 would have proceeded to block 272 to again check if the current estimated pose was the last pose.

After all the potential poses have been scanned and scored in the preceding blocks, computer vision system 26 may then proceed to block 274 where the corresponding pose with the best score is chosen as the best estimated pose. Again, the best estimated pose includes arm length 50L, arm angle θ and forearm angle Ø. From those three characteristics, the rest of the characteristics of the arm may be derived, namely, dimensions for arm box 50w, dimensions for forearm box 52L and 52w, and the location of elbow point 48. Again, dimensions 50w, 52w, and 52L may be determined using the body ratios associated with subject 30. Elbow point 48 is typically located at the center point of the distal end of arm box 50. After the best pose is determined, computer vision system 26 must then determine the hand points in block 276.

Figure 19:
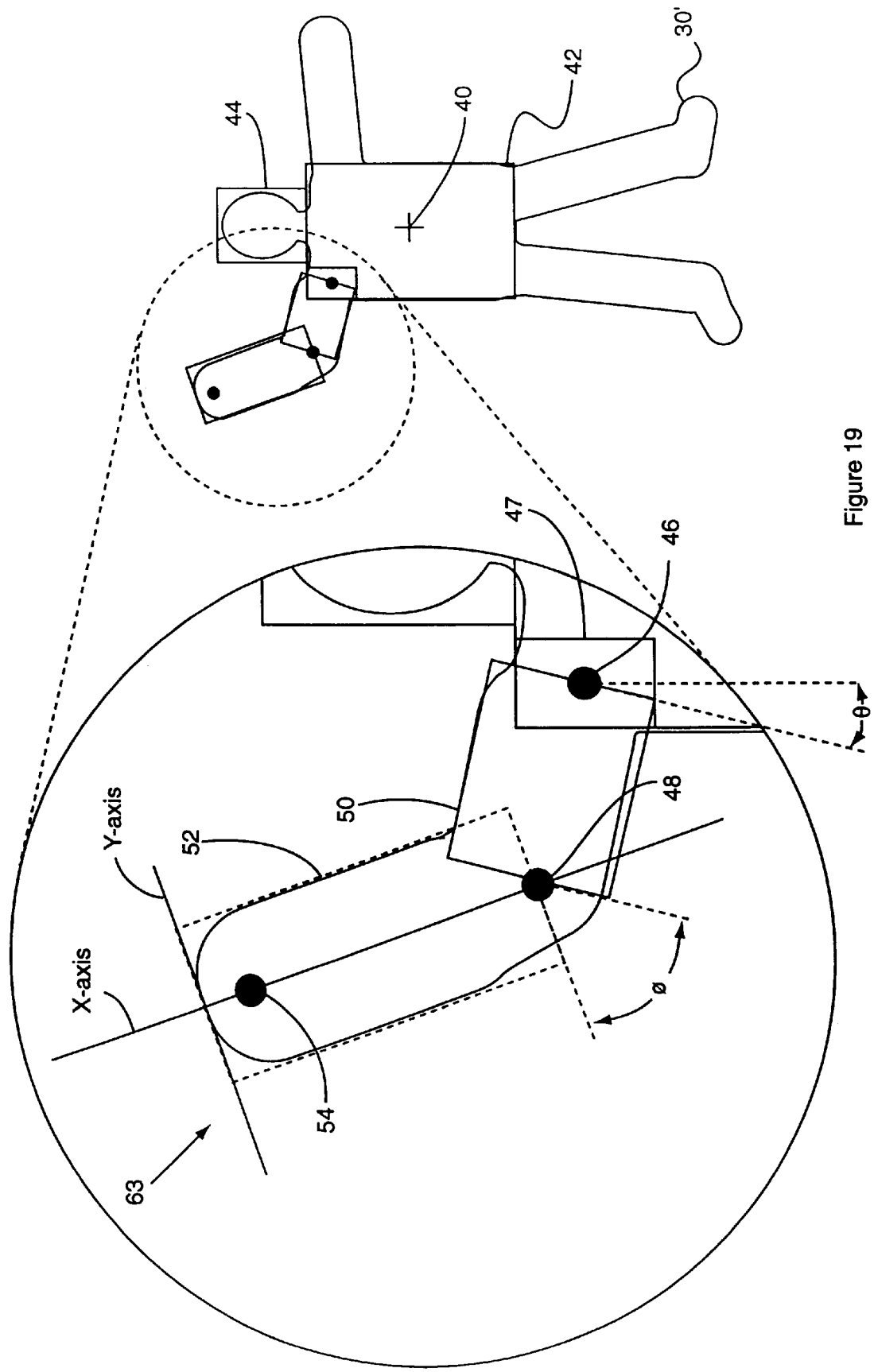
FIG. 19 illustrates a forearm box with x and y axes, in accordance with one embodiment of the present invention.

In one embodiment, the hand point may be located at the center of the distal end of forearm box 52. In another embodiment, hand point 54 may be located within forearm box 52 since oftentimes the hand is located short of the distal end of forearm box 52. One method to obtain an accurate hand point 54 is to count all the points in forearm box 52 using a weighted mass approach. Generally, the points within forearm box 52 are congregated towards the proximal end of forearm box 52 due to the nature of the forearm of a person. Thus, points located towards the distal end of forearm box 52 may be given a greater weight than the points located towards the proximal end of forearm box 52 in order to get an accurate estimate of hand point 54. The following equations may be used in order to obtain an estimate of hand points 54 using a two-dimensional distance from a point located at the center of the distal end of forearm box 52.

$$X_{mean} = \frac{\Sigma_{x,y} W(|x-w_x|, |y-w_y|) x \cdot \alpha(x, y)}{\Sigma_{x,y} W(|x-w_x|, |y-w_y|) \cdot \alpha(x, y)}$$

where $W(dx, dy) = -sqrt(dx^2 + dy^2) + k; k = $ constant and (x, y)=1 if point (x, y) falls within the alpha image; else (x, y)=0 if point (x, y) falls outside the alpha image.

where $x_{mean}$ is the x coordinate of the hand point where the center of the distal width-wise side of forearm box 52 is the origin. The x-axis is typically a length-wise bisecting midline of forearm box 52. The y coordinate is typically parallel to the width-wise sides of forearm box 52, as illustrated in FIG. 19.

In another embodiment, a weighted mass equation where $W(dx, dy) = -|dx| + k; k =$ constant may be utilized. However, any suitable method for computing a center point using a weighted mass approach may be used. FIG. 19 depicts a forearm box with x and y axes. However, any coordinate system may be utilized as long as a weighted center of mass point may be derived to provide a good approximation of hand points 54a and 54b.

FIG. 17 is a diagrammatic flowchart of block 205 of FIG. 16. Flowchart 205 proceeds from block 202 of FIG. 16 after an alpha image 30' and its body width 42w are provided by model based composition in block 209. In block 210, computer vision system 26 selects the appropriate ratios to be used for characterizing body box 42 and head box 44. In block 212, computer vision system 26 uses body width 42w to determine the first estimate for body height 42h. Proceeding to block 214, computer vision system 26 obtains an estimate for head height 44h using body width 42w and the estimate of body height 42h. In one embodiment, head height 44h extends vertically from the top of estimated body box 42. Also in block 214, computer vision system 26 also estimates head width 44w using body ratios. Thus after blocks 212 and 214, computer vision system 26 possesses body width 42w, an estimated body height 42h, an estimated head height 44h, and an estimated head width 44w derived from head height 44h.

Computer vision system 26 then proceeds to scan in other points located in the estimated body box and head box in block 216. In block 218, computer vision system 26 compares the score of the estimated body box and head box with the scores of previous estimated body boxes and head boxes. The highest score is kept as the current best score for those characteristics. In block 221, computer vision system 26 determines if the entire range of estimated head heights derived from body width 42w and estimated body height 42h have been scanned and scored. If further head heights remain in the range of estimated head heights, then computer vision system 26 returns to block 214 to obtain the next estimated head height in the range of estimated head heights. Similarly, in block 223, computer vision system 26 determines if the full range of body height 42h that may be derived from body width 42w has been scanned and scored. If further estimated body height remains, computer vision system 26 returns to block 212.

Once all the estimated body heights 42h and all their associated estimated head heights and head widths 44h and 44w, have been scanned and scored, computer vision system 26 proceeds to block 224. In block 224, the estimated body and head box associated with the best scores are selected as body 42 and head box 44. Thus, in one embodiment of the present invention, body point 40, body box 42 and head box 44 are characterized utilizing body width 42w, which was provided by the model based composting performed in block 202. As may be appreciated, the previous exemplary embodiment describes only one possible method of characterizing body box 42 and head box 44 and other suitable methods of determining the best estimated body box 42 and head box 44 utilizing known ratios may also be used in accordance with the present invention. After computer vision system 26 has determined body box 42 and head box 44 flowchart 205 ends in block 227, and computer vision system 26 may proceed to block 207 of flowchart 190 in FIG. 16.

The following discussion is in reference to one exemplary method of characterizing the arm of subject 30, referring to FIG. 18. FIG. 18 is a diagrammatic flowchart of block 254 of FIG. 16. After a particular pose for the arm of subject 30 has been chosen in block 252, the operations of flowchart 254 begin in block 259. Computer vision system 26 proceeds to block 260 to begin scanning the points located within the estimated pose. In block 260, computer vision system 26 scans a first pixel located in the estimated pose. If the pixel has a value of 1, or it is occupied, computer vision system 26 assigns a value of 1 for that pixel. If the pixel is empty, then computer vision system 26 assigns a zero for that pixel. Proceeding to block 262, computer vision system 26 accumulates the value of the pixel with the sum of the previous values of pixels already scanned. Thus, in block 262, computer vision system 26 retains a running total of the score for the estimated pose being scanned.

The running total obtained in block 262 is then compared in block 264. Computer vision system 26 adds the number of remaining points to be scanned that are located in the estimated pose with the running total retained in block 262. If the sum is less than the current best score, the best score obtained for the estimated poses already scored, then there is no need to further scan the remaining points in the current estimated pose since even if other remaining points left to be scanned had a value of 1, since the score for the current estimated pose will not exceed the current best score. If the current estimated pose cannot have a score greater than the current best score, then process flow jumps ahead to block 272 of flowchart 190 in FIG. 16 to move on to the next estimated pose, if necessary.

If the score of the current estimated pose may possibly have a score greater than the current best score, then in block 255, a determination is made regarding whether the running total for the current estimated pose is greater than a predetermined threshold. In one embodiment, a threshold may be set to limit the amount of scanning necessary for an estimated pose if a great number of points has already been determined to reside within the current estimated pose. By way of example, a threshold of 90% may be utilized. If the running total already equals or exceeds 90% of the highest possible score, then computer vision system 26 may select the current estimated pose as the best estimated pose, and process flow proceed to block 274 in flowchart 190 of FIG. 16. In an alternative embodiment, process flow may proceed to block 270 of flowchart 190 in FIG. 16 to determine if the score for the current estimated pose, even though it may be equal to or greater than 90% of the highest possible score, is greater than the current best score. In yet another embodiment, all scores for estimated poses that exceed the threshold derived in block 254 may be stored for later comparison using other criteria.

If the running total for the current estimated pose is not greater than the threshold, then process flow proceeds to block 267. In block 267, it is determined whether all the points have been scanned and scored within the estimated pose. If further points remain to be scanned and scored, then process flow returns to block 260. After the last point has been scored flowchart 259 ends in block 268, and computer vision system 26 moves to block 270 of flowchart 190 in FIG. 16, where the score of the current estimated pose is considered with the current best score.

As discussed, the methods for scanning and scoring estimated poses, as discussed in reference to FIGS. 17 and 18, may be accomplished with the use of a summed area table. By utilizing the features of a summed area table, as discussed in reference to FIGS. 14*a* and 14*b*, scanning and scoring of points may be performed with fewer computations than exhaustive scanning and scoring. However, different techniques for scanning and scoring may be more advantageous in different situations.

Therefore, several methods of scoring an estimated pose are disclosed. However, other methods of scoring may be utilized in accordance with the present invention. For example, the points of the arm in alpha image 30' may be scanned and scored using a quad tree structure methodology rather than the exhaustive method described. The points of the arm of alpha image 30' may be represented as nodes in a quad tree structure. Thus, alternative forms of sorting through the quad tree structure may be utilized in order to perform a more ordered search of all the points that reside in the current estimated pose. As may be appreciated, other methods of scanning and scoring points located in an estimated pose may be utilized in accordance with the present invention.

Additionally, other criteria may be used in the selection of poses. As discussed, a pose selected for the immediately preceding image may be used to help predict the best pose for the current image. Further, a number of preceding images may be used to also predict the current pose.

Different methods of searching through the number of potential poses may also be utilized in accordance with the present invention. Rather than starting a search at the smallest value of a particular range of a characteristic, an ordered search may be utilized. That is, a search may begin in the middle of a particular range and subsequent scans and scores directed by the trend in scoring of values being either above or below the mid-point of the particular range.

Also, different characteristics may be searched in different orders. In the illustrated embodiment, computer vision system may have searched through all the possible values of Ø, then proceed to the values of θ, and then the values for arm length 50L, or any other suitable order.

Subject characterization may be used for many different purposes. The determined characteristics of subject 30 may be used to perform pattern recognition. By way of example, a person with known characteristics may be detected by matching the characteristics. In another embodiment, subject 30 may be able to interact with computer vision system 26 through movement or position. The potential uses of the characteristics that may be determined by the present invention are numerous, and the scope of the present invention should be determined accordingly.

Although the foregoing invention has been described in some detail for purposes of clarity of understanding, it will be apparent that certain changes and modifications may be practiced within the scope of the appended claims. By way of example, a computer vision system in accordance with the present invention may be utilized for pattern recognition purposes, manufacturing quality control, motion analysis and security, or any other suitable purpose.

Furthermore, it should be noted that there are alternative ways of implementing both the method and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer implemented method for characterizing a sub-image within an image, wherein an alpha image of the sub-image and a first characteristic of the sub-image is provided, comprising determining a second characteristic based upon the first characteristic, wherein the second characteristic is determined by way of a plurality of bounding boxes, the location of the sub-image is compared to the locations of the plurality of bounding boxes and eliminating a subset of the plurality of bounding boxes that are not substantially co-located with the sub-image, wherein a plurality of potential estimates of the second characteristic based in part upon the first characteristic exists such that a subset of the plurality of potential estimates are eliminated from the plurality of potential estimates because the subset is not capable of being an accurate estimate of the second characteristic, whereby the determination of a best estimate is simplified.

2. A method as recited in claim 1, wherein the second characteristic is determined by a best estimate of the second characteristic based in part upon the first characteristic, wherein a plurality of potential estimates of the second characteristic based in part upon the first characteristic exist such that a subset of the plurality of potential estimates are eliminated from the plurality of potential estimates because the subset is not capable of being an accurate estimate of the second characteristic, whereby the determination of the best estimate is simplified.

3. A method as recited in claim 1, wherein the second characteristic is determined by making a first estimate of the second characteristic based upon the first characteristic and the reduced plurality of potential estimates, such that the reduced plurality of potential estimates is further reduced, whereby the determination of the best estimate is simplified.

4. A method as recited in claim 1, wherein the first and second characteristics are interrelated, the second characteristic is determined based upon the interrelationship between the first and second characteristics.

5. A method as recited in claim 1, wherein a best estimate of the second characteristic is determined from a plurality of potential estimates by eliminating a subset of the plurality of potential estimates that are improbable estimates of the second characteristics from the plurality of potential estimates.

6. A method as recited in claim 5, further comprising searching through the remaining estimates in the plurality of potential estimates and determining the best estimate.

7. A method as recited in claim 6, wherein the alpha image is comprised of a plurality of pixels such that the best estimate is chosen from the plurality of potential estimates based upon a status of a portion of the plurality of pixels of the alpha image associated with the second characteristic.

8. A computer readable medium including a computer readable code device configuring a computer to execute as recited in claim 1.

9. A computer implemented method for characterizing a subject comprising:
electronically imaging a scene including a subject, whereby an electronic image of the scene and an alpha image of the subject is created, wherein the alpha image is comprised of a plurality of pixels;
determining a first characteristic of from the alpha image, the first characteristic being indicative of the subject; and
determining a second characteristic indicative of the subject, wherein a plurality of potential estimates exists for the second characteristic, the operation of eliminating the subset of potential estimates including,
eliminating a subset of potential estimates from the plurality of potential estimates, whereby a reduced plurality of potential estimates is provided,
bounding a portion of the alpha image associated with the second characteristic with a plurality of bounding boxes,
determining that a first selected bounding box is empty bounding if the first selected bounding box does not contain any pixels of the portion of the alpha image associated with the second characteristic, wherein the subset of potential estimates eliminated from the plurality of potential estimates includes each estimate that corresponds to the first selected bounding box,
determining that a second selected bounding box is partially empty if the second selected bounding box contains a number of pixels of the portion of the alpha image associated with the second characteristic that is less than a lower threshold, wherein the subset of potential estimates eliminated from the plurality of potential estimates includes each estimate that corresponds to the second selected bounding box,
determining a score for a first estimate of the second characteristic from the reduced plurality of potential estimates, the score being indicative of the probability that the first estimate of the second characteristic is a best estimate, and repeating for each estimate of the reduced plurality of potential estimates, and
comparing the scores of the reduced plurality of potential estimates and choosing the best estimate from the reduced plurality of potential estimates having the best score as the second characteristic.

10. A computer-implemented digital video subject characterizing method comprising:
creating a background model by examining a plurality of frames of an average background image;
obtaining a frame of an input image that contains a subject to be characterized;
creating an alpha image such that a value of each pixel in the alpha image is set according to a value corresponding to a pixel from the input image and a value corresponding to a pixel from the average background image;
deriving a set of templates such that the set of templates comprises the shape of the subject being characterized;
setting the values of pixels in the alpha image according to the set of templates such that portions of the alpha image contained within the templates are adjusted so that the pixels do not represent holes in the subject;
deriving a first characteristic from a selected one of the set of templates of the alpha image; and
blending the subject in the input image onto the destination image.

11. A method as recited in claim 10, wherein the first characteristic is derived from the selected template based in part upon a first predetermined ratio between the first characteristic and the selected template.

12. A method as recited in claim 10, the method further comprising:
deriving a second characteristic from the first characteristic.

13. A method as recited in claim 12, wherein the second characteristic is derived from the first characteristic based in part upon a second predetermined ratio between the first characteristic and the second characteristic.

14. A computer implemented method for characterizing a subject such that the subject is represented in an electronic image, the method comprising:
electronically imaging a scene including a subject, wherein the electronic image of the scene and an alpha image of the subject is created, the alpha image being comprised of a plurality of pixels;

determining a first characteristic from the alpha image, the first characteristic being indicative of the subject;

deriving a plurality of potential estimates of a second characteristic indicative of the subject, based in part on the first characteristic; and determining a second characteristic indicative of the subject from the plurality of potential estimates, wherein determining the second characteristic includes:

bounding a portion of the alpha image associated with the second characteristic with a plurality of bounding boxes;

determining that a first selected bounding box is empty if the selected bounding box does not contain any pixels of the portion of the alpha image associated with the second characteristic;

eliminating a subset of potential estimates from the plurality of potential estimates, wherein the subset of potential estimates eliminated from the plurality of potential estimates includes each estimate that corresponds to the first selected bounding box, whereby a reduced plurality of potential estimates is provided; and determining a best estimate from the reduced plurality of potential estimates.

15. A method as recited in claim 14, wherein the operation of deriving the plurality of potential estimates of the second characteristics is based in part upon an interrelationship between the first and second characteristics.

16. A method as recited in claim 15, wherein the interrelationship between the first and second characteristics is a ratio.

17. A computer readable medium including a computer readable code device configuring a computer to perform the method as recited in claim 14.

18. A method as recited in claim 14, wherein the determination of whether the first selected bounding box is empty is made by utilizing a summed area table.

19. A computer implemented method for characterizing a subject such that the subject is represented in an electronic image, the method comprising:

electronically imaging a scene including a subject, wherein the electronic image of the scene and an alpha image of the subject is created, the alpha image being comprised of a plurality of pixels;

determining a first characteristic from the alpha image, the first characteristic being indicative of the subject;

deriving a plurality of potential estimates of a second characteristic indicative of the subject, based in part on the first characteristic;

determining a second characteristic indicative of the subject from the plurality of potential estimates wherein determining the second characteristic includes:

bounding a portion of the alpha image associated with the second characteristic with a plurality of bounding boxes;

determining that a first selected bounding box is partially empty if the selected bounding box contains a number of pixels of the portion of the alpha image associated with the second characteristic that is less than a lower threshold;

eliminating a subset of potential estimates from the plurality of potential estimates, wherein the subset of potential estimates eliminated from the plurality of potential estimates includes each estimate that corresponds to the second selected bounding box, whereby a reduced plurality of potential estimates is provided, and determining a best estimate from the reduced plurality of potential estimates.

20. A method as recited in claim 19, wherein the determination of whether the first selected bounding box is partially empty is made by utilizing a summed area table.

21. A computer implemented method for characterizing a subject such that the subject is represented in an electronic image the method comprising:

electronically imaging a scene including a subject, wherein the electronic image of the scene and an alpha image of the subject is created, the alpha image being comprised of a plurality of pixels;

determining a first characteristic from the alpha image, the first characteristic being indicative of the subject;

deriving a plurality of potential estimates of a second characteristic indicative of the subject, based in part on the first characteristic;

determining a second characteristic indicative of the subject from the plurality of potential estimates, wherein determining the second characteristic includes:

determining a score for a first estimate of the second characteristic from the reduced plurality of potential estimates, the score being indicative of the probability that the first estimate of the second characteristic is a best estimate, and repeating for each estimate of the reduced plurality of potential estimates;

comparing the scores of the reduced plurality of potential estimates; and choosing the best estimate having the best score as the second characteristic from the reduced plurality of potential estimates.

22. A method as recited in claim 21, wherein the operation of determining the second characteristic further includes:

eliminating a selected estimate from the reduced plurality of potential estimates, if the selected estimate is incapable of obtaining a score greater than a score for a previous estimate.

23. A method as recited in claim 21, wherein the operation of determining the second characteristic further includes:

choosing a selected estimate as the best estimate if the score of the selected estimate is greater than a threshold score.

24. A method as recited in claim 23, wherein the threshold score is set such that if the score of the selected estimate is greater than the threshold score then the probability that the selected estimate is the best estimate is greater than about 90%.

* * * * *

UNITED STATES PATENT AND TRADEMARK OFFICE
CERTIFICATE OF CORRECTION

PATENT NO. : 6,031,934
DATED : February 29, 2000
INVENTOR(S) : Subutai Ahmad et al.

It is certified that error appears in the above-identified patent and that said Letters Patent is hereby corrected as shown below:

Column 8,
Line 61, reads "bent may also be determined. An arm angle 0 indicates the"; it should read -- bent may also be determined. An arm angle $\theta$ indicates the --;

Column 9,
Line 1, reads "52 adjacent to arm box 50. Forearm angle 0 may then be"; it should read -- 52 adjacent to arm box 50. Forearm angle $\theta$ may then be --;

Column 10,
Line 8, reads "arm length SOL is required, since the other dimensions of"; it should read -- arm length 50L is required, since the other dimensions of --;
Line 12, reads "SOL and angles $\theta$ and Ø that locate the arm within the"; it should read -- 50L and angles $\theta$ and Ø that locate the arm within the --;

Column 13,
Line 53, reads "subsegments 70*a* through 70*d*, 71 a through 7 id and 72*a*"; it should read -- subsegments 70*a* through 70*d*, 71*a* through 71*d* and 72*a* --;
Line 55, reads "70*a* through 70*d*, 71 a through 72*d*, and 72*a* through 72*d*"; it should read -- 70*a* through 70*d*, 71*a* through 71*d*, and 72*a* through 72*d* --;

Column 17,
Line 64, reads "(x,y)=1 if point (x,y) falls within the alpha image; else"; it should read -- $\alpha$(x,y)=1 if point (x,y) falls within the alpha image; else --;
Line 65, reads "(x,y)=0 if point (x,y) falls outside the alpha image."; it should read -- $\alpha$(x,y)=0 if point (x,y) falls outside the alpha image. --;

Column 23,
Line 35, reads "18. A method as recited in 14, wherein the determination"; it should read -- 18. A method as recited in claim 14, wherein the determination --

UNITED STATES PATENT AND TRADEMARK OFFICE
CERTIFICATE OF CORRECTION

PATENT NO. : 6,031,934
DATED : February 29, 2000
INVENTOR(S) : Subutai Ahmad et al.

It is certified that error appears in the above-identified patent and that said Letters Patent is hereby corrected as shown below:

Column 24,
Line 9, reads "provides, and"; it should read -- provides; and --;
Line 17, reads "image the method comprising:"; it should read -- image, the method comprising: --;

Signed and Sealed this

Twenty-first Day of May, 2002

*Attest:*

JAMES E. ROGAN
*Director of the United States Patent and Trademark Office*

*Attesting Officer*